(12) United States Patent
Robbins

(10) Patent No.: US 7,195,487 B2
(45) Date of Patent: Mar. 27, 2007

(54) TWO-WHEELED VEHICLES AND CONTROL SYSTEMS AND METHODS THEREFOR

(76) Inventor: Alan R. Robbins, 38 Clark St., Winchester, MA (US) 01890-1806

( * ) Notice: Subject to any disclaimer, the term of this patent is extended or adjusted under 35 U.S.C. 154(b) by 197 days.

(21) Appl. No.: 10/783,697

(22) Filed: Feb. 21, 2004

(65) Prior Publication Data

US 2005/0187641 A1    Aug. 25, 2005

(51) Int. Cl.
G09B 9/04    (2006.01)
(52) U.S. Cl. .............................. 434/61; 434/61; 434/67
(58) Field of Classification Search ................. 434/61, 434/29, 54, 67; 180/21
See application file for complete search history.

(56) References Cited

U.S. PATENT DOCUMENTS

| 3,373,832 | A | | 3/1968 | Summers |
| 3,465,840 | A | | 9/1969 | Summers |
| 5,006,072 | A | * | 4/1991 | Letovsky et al. ............. 434/61 |
| 5,209,662 | A | * | 5/1993 | Fujita et al. .................. 434/61 |
| 6,030,223 | A | * | 2/2000 | Sugimori ...................... 434/61 |
| 6,234,800 | B1 | * | 5/2001 | Koyama et al. ............. 434/61 |
| 6,360,838 | B1 | | 3/2002 | Kulhavy |
| 6,382,338 | B1 | * | 5/2002 | Forbes ....................... 180/193 |
| 6,609,912 | B1 | * | 8/2003 | Harashima et al. ........... 434/61 |

* cited by examiner

*Primary Examiner*—Kathleeen Mosser
*Assistant Examiner*—Cameron Saadat
(74) *Attorney, Agent, or Firm*—O'Connell Law Firm

(57) ABSTRACT

A two-wheeled vehicle motion simulation arrangement comprising a platform; a simulated two-wheeled vehicle; an arrangement for retaining the simulated two-wheeled vehicle relative to the platform with a roll axis; and a control system for imparting motion to the platform in response to control inputs from a rider. The arrangement can additionally include mechanisms for moving the platform over a support surface.

15 Claims, 14 Drawing Sheets

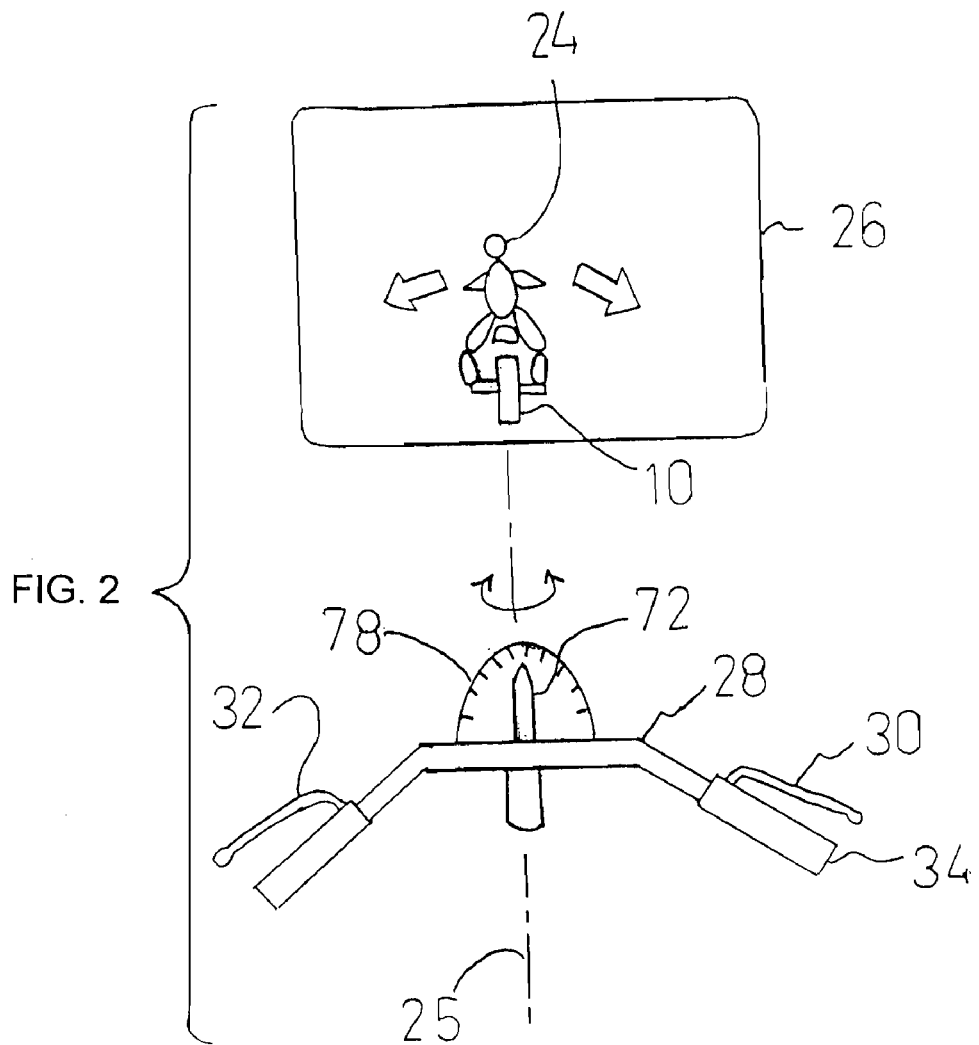

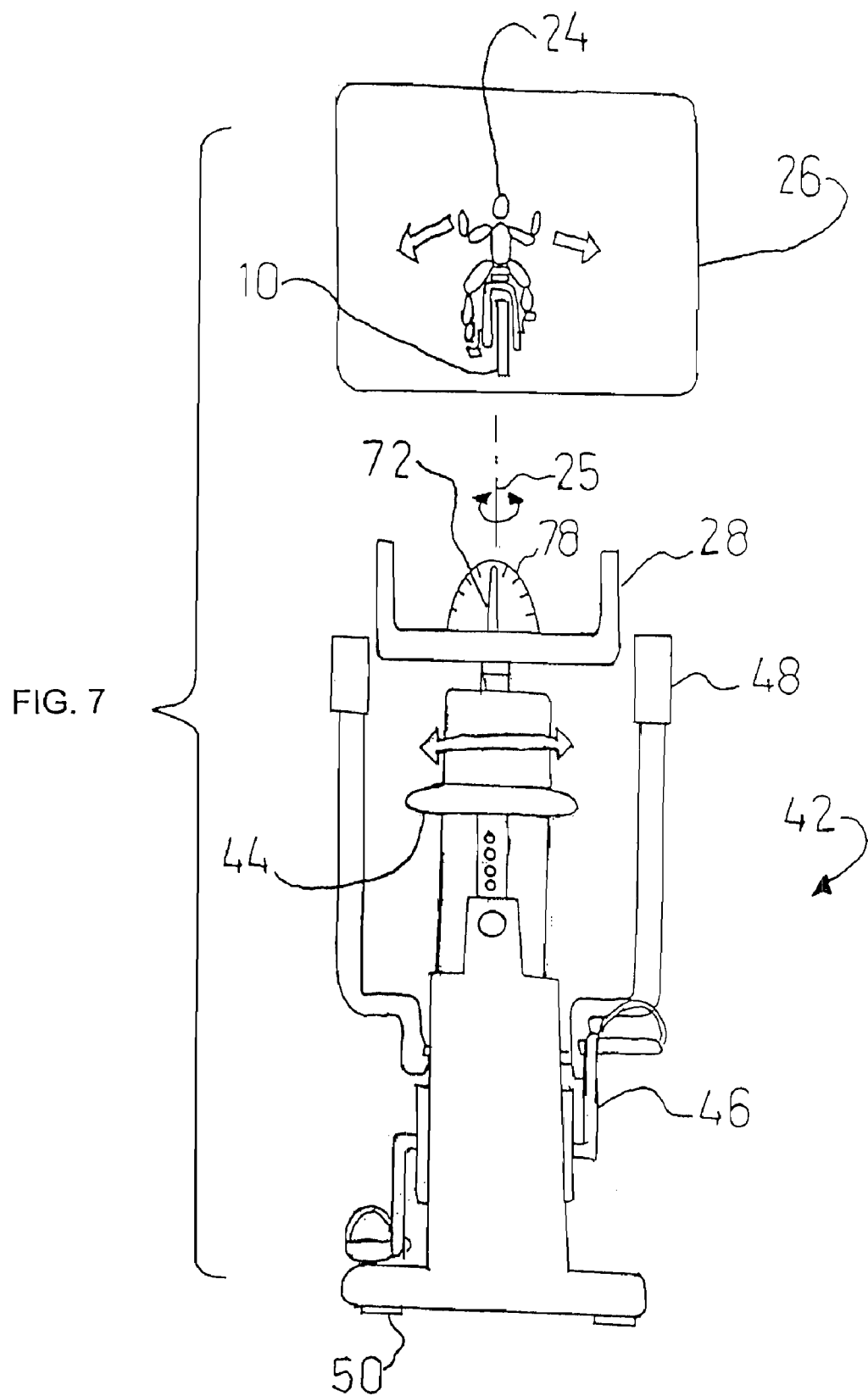

TWO-WHEELED VEHICLES AND CONTROL SYSTEMS AND METHODS THEREFOR

FIELD OF THE INVENTION

The present invention relates generally to land vehicles. Stated more particularly, this patent discloses and protects plural embodiments of two wheeled vehicles and control systems and methods for those vehicles, both as embodied in reality and in simulations thereof.

SUMMARY OF THE INVENTION

A basic object of certain embodiments of the present invention is to provide simulated two-wheeled vehicles and control system and methods therefor that operate in truly accurate simulation of two-wheeled vehicular function.

A fundamental object of particular objects of the invention is to provide actual two wheeled vehicles that can be remote controlled in realistic representation of actual two-wheeled vehicle riding and control.

An essential object of still other embodiments of the present invention is to provide two-wheeled transportation vehicles for providing an occupant with stability and safety during two-wheeled vehicular operation.

These and further objects and advantages of the invention will become obvious not only to one who reviews the present specification and drawings but also to one who has an opportunity to make use of an embodiment of the present invention for table and meeting constructions and arrangements. However, it will be appreciated that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the present invention.

One will appreciate, however, that the present discussion broadly outlines certain more important goals and features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

BRIEF DESCRIPTION OF THE DRAWINGS

In the accompanying drawing figures:

FIG. 2 is a view in rear elevation of a control system for a visually simulated two-wheeled vehicle according to the present invention;

FIG. 7 is a view in rear elevation of a fitness-oriented control system for a visually simulated two-wheeled vehicle according to the present invention;

DETAILED DESCRIPTION OF PREFERRED EMBODIMENTS

As with many inventions, the present invention for two-wheeled vehicles and control systems and methods therefor can assume a wide variety of embodiments. However, to assist those reviewing the present disclosure in understanding and, in appropriate circumstances, practicing the present invention, certain exemplary embodiments of the invention are described below and shown in the accompanying drawing figures.

Theoretical Method of Operation.

Figure 1:
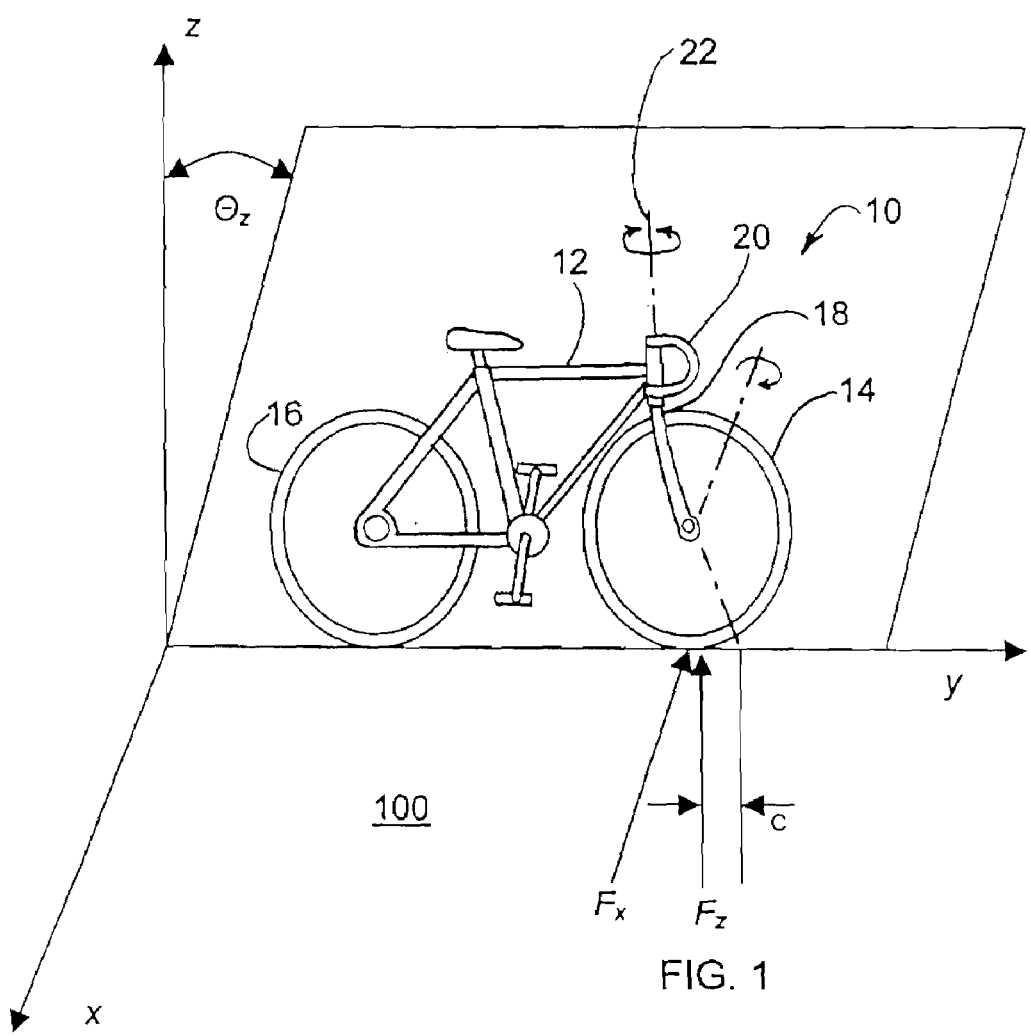
FIG. 1 is a spatial view of a two-wheeled vehicle, namely a bicycle, banked away from vertical by an angle $\theta_z$.

To gain a basic understanding of the theoretical method of operation that can be incorporated into each of the embodiments disclosed herein, one can give reference first to FIG. 1. There, an exemplary two-wheeled vehicle, in this case a typical bicycle, is indicated generally at 10. The two-wheeled vehicle 10 is disposed within a spatial framework defined by x, y, and z axes. The two-wheeled vehicle 10 can be considered to have a path of travel over a support surface 100 along they axis with the x axis being perpendicular to the path of travel and the z axis defining true vertical. With the two-wheeled vehicle 10 traveling along the y axis, the y axis can be considered to be a roll axis about which the two-wheeled vehicle 10 can be considered to bank.

The two-wheeled vehicle 10 is founded on a frame 12. The orientation of the two-wheeled vehicle 10 with respect to vertical can be considered to be defined by the orientation of the frame 12. A rear wheel 16 is rotatably retained relative to the frame 12. A front wheel 14 is rotatably retained relative to the frame 12 and in tandem with the rear wheel 16 by a steering fork 18. The orientation of the steering fork 18 and the front wheel 14 relative to the frame 12 can be controlled by a steering arrangement 20 to cause a pivoting about a steering axis 22.

The steering axis 22 projects rearwardly relative to true vertical to yield a positive caster distance C defined by the distance between the lead point where the steering axis 22 intersects the support surface 100 and the point of contact of the front wheel 14 relative to the support surface 100. The positive caster distance C gives the two-wheeled vehicle 10 directional stability since the load of the two-wheeled vehicle 10 and its cargo will be projected in front of the center or point of the tire contact area whereby the front wheel 14 can be considered to be biased to a straight-ahead orientation by a caster torque $T_c$. As such, the positive caster distance C where the point of load being ahead of the point of contact causes the two-wheeled vehicle 10 to resist being steered away from a straight-ahead disposition.

The orientation of the two-wheeled vehicle 10 with respect to vertical can be considered to be defined by the orientation of the frame 12. In the example of FIG. 1, the two-wheeled vehicle 10 is tilted away from vertical through a bank angle $\theta_z$ as it would be while undertaking a left turn. During such a banking of the two-wheeled vehicle 10, the front wheel 14 and the support surface 100 will exert equal and opposite forces relative to one another. A downward component of the force exerted by the front wheel 14 of the two-wheeled vehicle 10 is opposed by a vertical force component $F_z$ exerted by the support surface 100, and a lateral component the force exerted by the front wheel 14 of the two-wheeled vehicle 10 during the turn is opposed by a lateral force component $F_x$ exerted by the support surface 100 to the left.

Under the Theoretical Method of Operation disclosed herein, the vertical force component $F_z$ produces a counter-clockwise torque, which can be termed a vertical-force induced torque $T_z$, on the steering arrangement 20 when the two-wheeled vehicle 10 is banked to the left. The opposite would be true where the two-wheeled vehicle 10 is banked to the right. In any case, the vertical-force induced torque $T_z$ will tend to cause the steering arrangement 20 to turn deeper into the turn being undertaken by the two-wheeled vehicle 10. That vertical-force induced torque $T_z$ can be approximated by Equation 1 below.

$$T_z=(F_z)(C)(\sin \theta_z) \quad \text{(Equation 1)}$$

Likewise, the lateral force component $V_x$ will produce a torque on the steering arrangement 20, which can be termed a lateral-force induced torque $T_x$. The lateral-force induced torque $T_x$ will tend to steer the two-wheeled vehicle 10 out of the turn. Therefore, where the two-wheeled vehicle 10 is disposed in a left turn as depicted in FIG. 1, the lateral-force induced torque $T_x$ will be in the clockwise direction. If the two-wheeled vehicle 10 were oppositely banked in a right turn, the vertical-force induced torque $T_z$ would operate in a clockwise direction while the lateral-force induced torque $T_x$ would operate in a counter-clockwise direction. The lateral-force induced torque $T_x$ can be approximated by Equation 2 below.

$$T_x=(Fx)(C)(\cos \theta_z) \quad \text{(Equation 2)}$$

In either case, the vertical-force induced torque $T_z$ and the lateral-force induced torque $T_x$ will operate in opposition. With the steering axis 22 in the same plane as the frame 12, no net torque about the roll axis y will result therefrom. Accordingly, the vertical-force induced torque $T_z$ and the lateral-force induced torque $T_x$ will tend to reach an equilibrium where $T_z$ equals $T_x$. With $T_z$ equaling $T_x$, the two-wheeled vehicle 10 itself will tend toward an equilibrium state where the two-wheeled vehicle 10 will tend neither toward a deeper bank angle $\theta_z$ nor a shallower bank angle $\theta_z$. Each embodiment of the invention disclosed herein can be caused to operate or can be treated as being operable under this Theoretical Method of Operation.

Figure 1B:
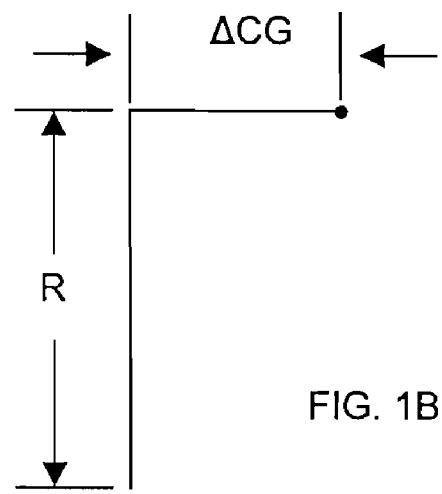
FIG. 1B is a schematic view depicting a shift in center of gravity relative to the two-wheeled vehicle.
Figure 1C:
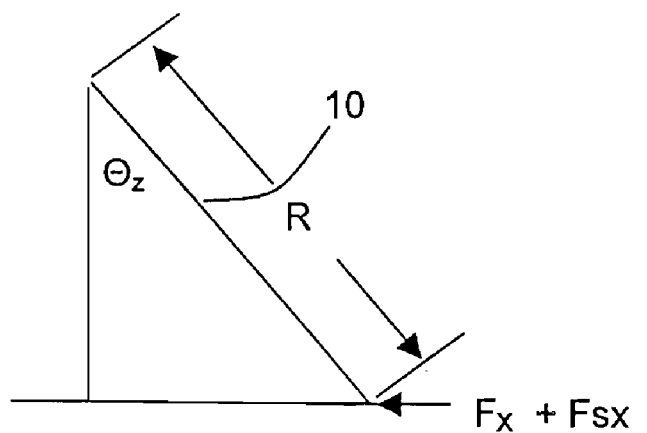
FIG. 1C is a schematic view depicting forces deriving from a torquing of the steering arrangement.
Figure 1D:
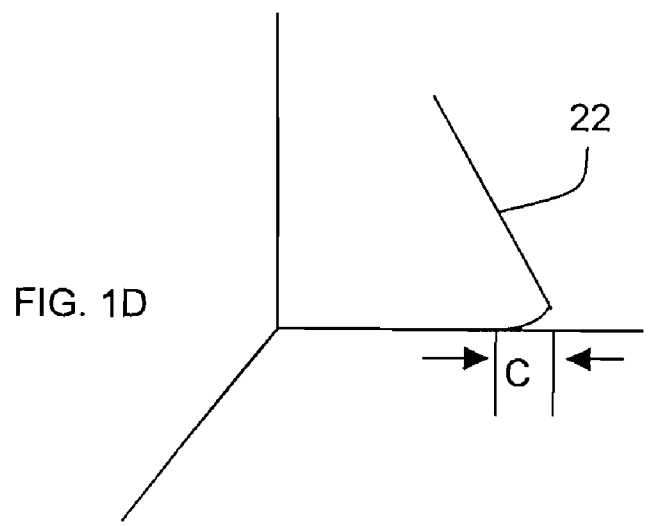
FIG. 1D is a further schematic view depicting forces deriving from a torquing of the steering arrangement.

The equilibrium can be disturbed in two basic ways: by a rider's imparting a steering torque on the steering arrangement 20 and/or by producing a shifting of the center of gravity of the overall mass of the two-wheeled vehicle 10 and the rider as by leaning. FIG. 1B shows schematically a shift in center of gravity relative to the two-wheeled vehicle. The roll acceleration deriving from the shift in center of gravity can be determined by Equation 3 below.

$$\text{Roll Acceleration}=(\Delta CG/R^2)(G/\cos \theta_z) \quad \text{(Equation 3)}$$

Where,
  $\Delta CG$ is the horizontal change in the location of the center of gravity;
  R is the radius of gyration; and
  G is gravity.

The roll acceleration deriving from a steering torque $T_s$ applied to the steering arrangement 20 can be calculated employing Equation 4 below.

$$\text{Roll Acceleration}=(((T_s G)/(C \cos \theta_z))(\cos \theta_z))/M)/R \quad \text{(Equation 4)}$$

Where,
  $T_s$ is the steering torque;
  G is gravity;
  C is the caster distance;
  M is the total mass; and
  R is the radius of gyration.

Control of Visually Simulated Two-Wheeled Vehicle

A first example of the many possible applications of the aforedescribed Theoretical Method of Operation is depicted in FIG. 2. There, a visually simulated two-wheeled vehicle 10, in this example comprising a motorcycle, is displayed on a display screen 26 retaining a simulated rider 24. A steering arrangement 28, in this case handlebars, is pivotable about a steering axis 25 to impart a steering control over the simulated two-wheeled vehicle 10 and the simulated rider 24 employing a control system. The steering arrangement 28 can be retained relative to any appropriate structure (not shown in FIG. 2). By operation of the steering arrangement 28 and, preferably, based on a control system founded on the Theoretical Method of Operation disclosed herein, a user can control the simulated two-wheeled vehicle 10 in a manner that simulates the reality of two-wheeled vehicular motion most accurately. An indicator wand 72, which can be an actual wand or a visual representation thereof, can be operably associated with the steering arrangement 28, the display screen 26, or otherwise disposed to be viewed by the user for providing an indication of the bank angle $\theta_z$ of the two-wheeled vehicle 10 to better enable the person's control thereover. A graduated scale 78 can act as a backdrop for the indicator wand 72.

A user can manipulate the steering arrangement 28 by a pivoting about the steering axis 25 based on the visual feedback provided by the display of the simulated two-wheeled vehicle 10 and/or by the indicator wand 72 to attempt to steer, balance, and maintain the overall stability of the simulated two-wheeled vehicle 10 during simulated vehicular movement. Control over the simulated two-wheeled vehicle 10 can be enhanced in certain embodiments by an accelerator 34, a braking lever 30, and a clutch lever 32 with the effect of each control means being realistically reflected in the operation of the simulated two-wheeled vehicle 10.

Under such an arrangement, a user can gain a realistic perception of the banking, turning, and other control characteristics and requirements of a two-wheeled vehicle without or prior to actually undertaking such activity. To do so, the user will impart a steering torque $T_s$ on the steering arrangement 28 to disturb the equilibrium that would otherwise tend to exist between the vertical-force induced torque $T_z$ and the lateral-force induced torque $T_x$ to initiate an adjustment of the orientation of the front wheel 14 and the orientation of the two-wheeled vehicle 10 in general. With this, the two-wheeled vehicle 10 can be controlled in a stable manner by being selectively induced into a deeper bank angle $\theta_z$ or a shallower bank angle $\theta_z$ as may be necessary to effectuate the desired steering control.

Another visually simulated two-wheeled vehicle 10 is depicted in FIG. 7 where the simulated two-wheeled vehicle 10 is again depicted on a display screen 26 retaining a simulated rider 24. A steering arrangement 28 can again be pivoted about a steering axis 25 to effect a control of the steering, balance, and other handling characteristics of the simulated two-wheeled vehicle 10. In this case, however, the steering arrangement 28 is retained relative to a seating arrangement 42 that has a seat 44 on which a rider can sit. An indicator wand 72, which can be an actual wand or a visual representation thereof, can be operably associated with the steering arrangement 28, the display screen 26, or otherwise disposed to be viewed by the user for providing an indication of the bank angle $\theta_z$ of the two-wheeled vehicle 10 to better enable the person's control thereover. Again, a graduated scale 78 can act as a backdrop for the indicator wand 72. The seating arrangement 42 can incorporate load cells 50 or any other means for sensing a weight distribution of the rider.

Under this arrangement, the rider can impart a controlling force that can be sensed by the sensing means by leaning or otherwise shifting his or her weight relative to the seating arrangement 42. More particularly, the sensing means can perceive a change in the rider's center of gravity and, based on that change in center of gravity, can determine what the effect would be on an actual bicycle, which can be assumed to follow the Theoretical Method of Operation disclosed herein, and then depict that effect relative to the simulated two-wheeled vehicle 10 on the display screen 26. With this, a rider can lean and otherwise manipulate his or her center of gravity to supplement or replace the control that could be imparted by use of the steering arrangement 28. Indeed, as one may infer from the depiction of the simulated rider 24 of FIG. 7, the actual rider could control the simulated two-wheeled vehicle 10 only by the aforementioned leaning or other weight redistribution to simulate riding a two-wheeled cycle with no hands. In certain applications, the seating arrangement 42 could pursue an exercise format, such as with the incorporation of cycle pedals 46 and, additionally or alternatively, arm levers 48.

Under such a construction, a mathematical model of the performance can be determined as follows. The radius of gyration can be assumed to be 4 feet about the support surface. The weight of the simulated two-wheeled vehicle 10 and rider can be assumed to be 200 lbs total. With such an arrangement, the angular acceleration and the lateral acceleration can be respectively determined by Equations 5 and 6 below.

$$\ddot{\theta} = \frac{T}{200 \text{ lbs}} \cdot \frac{1}{(4 \text{ ft})^2} \cdot 32 \text{ ft/s}^2 \cdot \frac{1}{\cos\theta} \quad \text{(Equation 5)}$$

$$\text{Lateral Acceleration} = 32^{ft}/s^2 \cdot (\tan\theta) \quad \text{(Equation 6)}$$

Where T is the torque deriving from the rider's lateral leaning based on the readings of the load cells 50.

Remote Control of Physical Simulation of Two-Wheeled Vehicle

Figure 3:
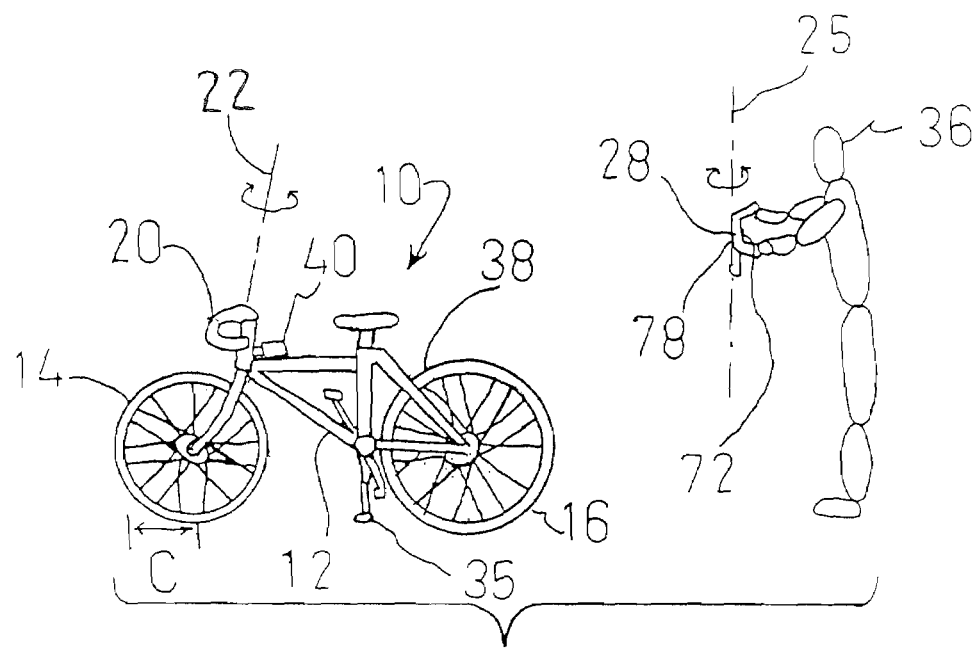
FIG. 3 is a view in side elevation of a remote control system for a physical simulation of a two-wheeled vehicle pursuant to the present invention.

The invention could further be employed in relation to the remote control of a physical simulation of a two-wheeled vehicle 10 as is depicted, by way of example, in FIG. 3. There, a person 36, whether an adult or a child, controls a two-wheeled vehicle 10, in this case a bicycle, by a pivoting of a remote steering arrangement 28, which can be pivotable about a steering axis 25. The remote steering arrangement 28 could pivot about the steering axis 25 by any appropriate means including by having a portion thereof retained relative to the person 36, by having a portion thereof retained relative to a mobile support arrangement (not shown in FIG. 3), by incorporation of a means for sensing an orientation of the remote steering arrangement 28, or by any other appropriate means. Again, an indicator wand 72, which can be an actual wand or a visual representation thereof, can be operably associated with the steering arrangement 28 or otherwise disposed to be viewed by the user for providing an indication of the bank angle $\theta_z$ of the two-wheeled vehicle 10 to better enable the person's control thereover. A graduated scale 78 can act as a backdrop for the indicator wand 72.

The two-wheeled vehicle 10 in the embodiment of FIG. 3 can have a frame 12 retaining front and rear wheels 14 and 16. The orientation of the front wheel 14 can be controlled by a steering arrangement 20 that pivots about a steering axis 22. A propulsion system 38 can provide propulsive force to the two-wheeled vehicle 10, such as by inducing a rotation of the rear wheel 16. A steering controller 40 can control the orientation of the steering arrangement 20 and the front wheel 14 in response to a control signal provided by the remote steering arrangement 28. A banking arrangement 35, which can take any appropriate form, can adjust the bank angle $\theta_z$ of the two-wheeled vehicle 10 to simulate the banking responses that would be demonstrated by an actual two-wheeled vehicle 10, which can be assumed to operate under the Theoretical Method of Operation disclosed herein. In this example, the banking arrangement 35 comprises opposed wheeled hydraulic or other extensible and retractable members. However, it will be clear that innumerable banking arrangements 35 would readily occur to one skilled in the art after reading this disclosure.

Under this arrangement, a person 36 can achieve realistic control over the physical simulation of the two-wheeled vehicle 10 by operation of the remote steering arrangement 28. For example, with the propulsion system 38 propelling the two-wheeled vehicle 10 forward at some vehicle speed, the person 36 can induce a pivoting of the steering arrangement 20 of the two-wheeled vehicle 10 by a pivoting of the remote steering arrangement 28 thereby to steer and balance the two-wheeled vehicle 10, which again can be assumed to operate under the Theoretical Method of Operation described herein. The control over the banking and other characteristics of the two-wheeled vehicle 10 can be carried out assuming the two-wheeled vehicle 10 to be traveling at its actual vehicular speed or based on some upward or, more likely, downward scaling of the vehicular speed and the performance characteristics attendant thereto. With this, the user can watch and/or follow behind the two-wheeled vehicle 10 to experience, demonstrate, and, if necessary, learn the balancing and control requirements for maintaining an actual two-wheeled vehicle in a stable manner.

Figure 4:
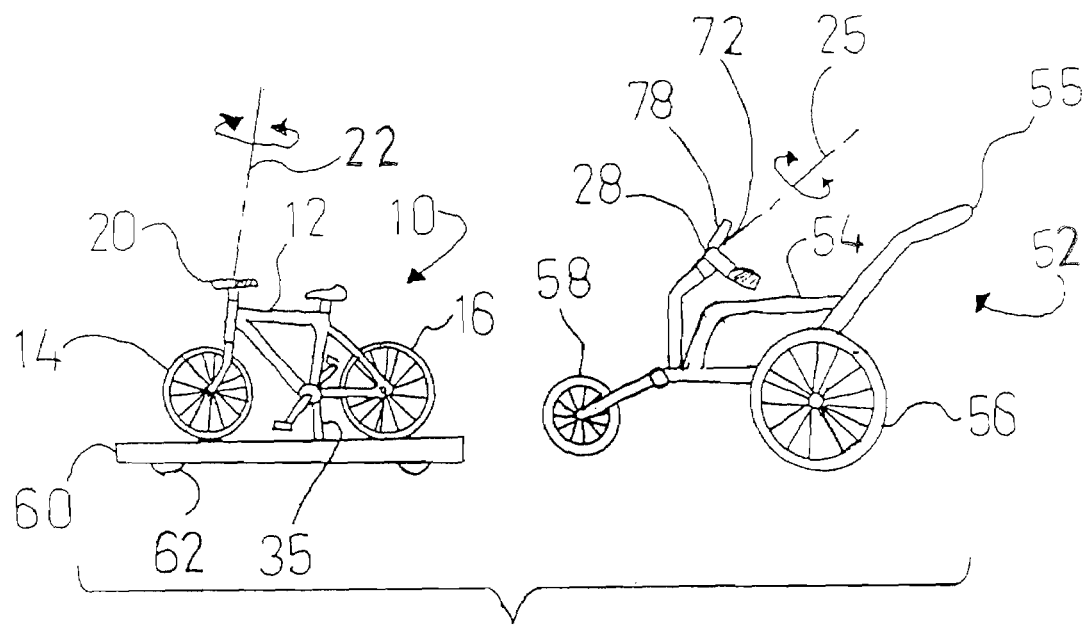
FIG. 4 is a view in side elevation of an alternative embodiment of a remote control system for a physical simulation of a two-wheeled vehicle according to the present invention.

Another system for enabling the remote control of a physical simulation of a two-wheeled vehicle 10 is depicted in FIG. 4. There, the physical simulation of the two-wheeled vehicle 10, again taking the form of a bicycle, is mounted on a mobile platform 60 that incorporates a means for traveling over a support surface, which can be a solid surface, a water surface, or any other support surface. In this example, the means for traveling over a support surface comprises a plurality of wheels 62, which can be rotatable and pivotable to enable a maneuvering of the mobile platform 60 and, therefore, the two-wheeled vehicle 10 over substantially any path of travel. The steering arrangement 20 and the front wheel 14 can again be pivoted about a steering axis 22 under the remote control of a remote steering arrangement 28 that is pivotable about a steering axis 25. The bank angle $\theta_z$ of the two-wheeled vehicle 10 can be adjusted to simulate the banking responses that would be demonstrated by an actual two-wheeled vehicle 10 by a banking arrangement 35, which again can take any appropriate form. In this example, the banking arrangement 35 comprises a pivotable rod. The operation of the two-wheeled vehicle 10 can again be controlled based on the Theoretical Method of Operation disclosed herein. An indicator wand 72, which can be an actual wand or a visual representation thereof, can be operably associated with the steering arrangement 28 or otherwise disposed to be viewed by the user for providing an indication of the bank angle $\theta_z$ of the two-wheeled vehicle 10 to better enable the person's control thereover. A graduated scale 78 can act as a backdrop for the indicator wand 72.

In the embodiment of FIG. 4, the steering arrangement 28 is pivotally retained relative to a vehicle frame 54 of a remote control vehicle 52. The remote control vehicle 52 in this embodiment takes the form of a wheeled vehicle similar to a typical jogging stroller that has relatively large rear wheels 56 and a relatively smaller front wheel 58 rotatably retained relative to the vehicle frame 54. The vehicle frame 54 either includes or retains a handle 55. Under such an arrangement, a person seeking to control the two-wheeled vehicle 10, such as a child seeking to learn how to control and ride an actual bicycle or one merely wanting to enjoy attempting to control the two-wheeled vehicle 10, can sit in the remote control vehicle 52 most likely while being pushed behind the moving two-wheeled vehicle 10 and mobile platform 60 by another person. In certain embodiments, the steering arrangement 28 can incorporate a means for exhibiting a torque during operation of the two-wheeled vehicle 10 that is simulative of the torque that would be exhibited by an actual two-wheeled vehicle under the represented vehicular speed and other conditions. That torque and the performance characteristics of the two-wheeled vehicle 10 can again be governed by the Theoretical Method of Operation described herein.

A filler understanding may be had by reference to a mathematical example of the control of a simulated two-wheeled vehicle 10. One can assume that the lean angle is zero when the two-wheeled vehicle 10 is in a vertical disposition and positive when leaned to the right. One can also assume that the angle of the steering arrangement 20 or handlebars 20 is zero when in a neutral position and positive when turned to the right. An exemplary two-wheeled vehicle 10 can be assumed to be traveling at 8 ft/s and to have a radius of gyration of 3 feet and a wheel base of 32 inches. The rider can be assumed to weigh 50 lbs, and a caster of 2 inches can be employed. One can further assume that the simulated tire demonstrates a slip angle of 0.1 radians at maximum lateral force. The system can impart a torque to the handlebars 20 when they are turned to produce a torque feedback. With such an arrangement, the feedback torque, the angular acceleration, and the lateral acceleration can be respectively determined by Equations 7, 8, and 9 below.

$$T = \frac{2 \text{ in.}}{12 \text{ in/ft}} \cdot 25 \text{ lb} \cdot \frac{\left[\psi - \left(\frac{32 \text{ in}}{12 \text{ in/ft}} \cdot 32 \text{ ft/s}^2\right) \Big/ (8 \text{ ft/s})^2\right]}{0.1 \text{ radian}} \quad \text{(Equation 7)}$$

$$\ddot{\theta} = -\frac{12 \text{ in/ft}}{2 \text{ in}} \left[\frac{T}{25 \text{ lb}}\right] \frac{1}{3 \text{ ft}} \cdot 32 \text{ ft/s}^2 \quad \text{(Equation 8)}$$

$$\text{Lateral Acceleration} = 32 \text{ ft/s}^2 \left[\tan\theta + \frac{12 \text{ in/ft}}{2 \text{ in}} \cdot \frac{T}{25 \text{ lb}}\right] \quad \text{(Equation 9)}$$

Where $\psi$ is the handlebar angle.

Figure 5:
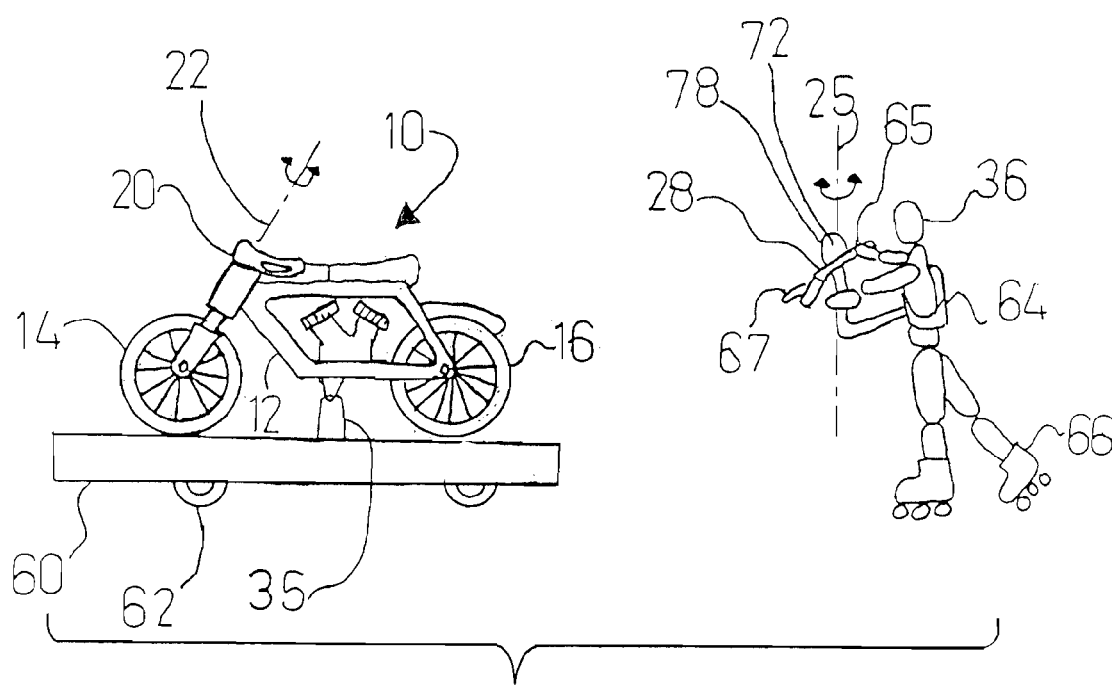
FIG. 5 is a view in side elevation of another embodiment of a remote control system for a physical simulation of a two-wheeled vehicle pursuant to the present invention.

FIG. 5 depicts still another system for enabling the remote control of a physical simulation of a two-wheeled vehicle 10. In the embodiment of FIG. 5, the remote steering arrangement 28 is retained directly by the person 36 by a harness arrangement 64. Also, the person 36 in this example is outfitted with wheeled skates 66 for better enabling him or her to follow the two-wheeled vehicle 10 during movement thereof. The two-wheeled vehicle 10 in this physical simulation comprises a simulation of a motorcycle. The two-wheeled vehicle 10 is again disposed on a mobile platform 60 that can be propelled by steerable wheels 62. The bank angle $\theta_z$ of the two-wheeled vehicle 10 can be adjusted to simulate the banking responses that would be demonstrated by an actual two-wheeled vehicle 10 by a banking arrangement 35. The steering arrangement 20 of the two-wheeled vehicle 10 can be caused to pivot about the pivot axis 22 by the remote control of the remote steering arrangement 28. An indicator wand 72, which again can be an actual wand or a visual representation thereof, can be operably associated with the steering arrangement 28 or otherwise disposed to be viewed by the user for providing an indication of the bank angle $\theta_z$ of the two-wheeled vehicle 10 to better enable the person's control thereover. A graduated scale 78 can act as a backdrop for the indicator wand 72.

In certain embodiments, the remote steering arrangement 28 can provide the person 36 with a sensation of the actual torque characteristics that would be experienced during control of an actual two-wheeled vehicle. The physical simulation of the two-wheeled vehicle 10 can in particular embodiments comprise a miniature simulation of an actual two-wheeled vehicle and accordingly can exhibit scaled velocity and, possibly, other performance characteristics. Under this arrangement, a person 36 can travel, such as by skating, behind the two-wheeled vehicle 10 while controlling the same by use of the steering arrangement 28. The steering arrangement 28 can further include an accelerator 65 and a brake lever 67 for enabling the person 36 to control the relative velocity of the two-wheeled vehicle.

With this, one person 36 or multiple persons 36 could each control a two-wheeled vehicle 10 in any appropriate manner including, by way of example, by manipulating the two-wheeled vehicle 10 through a designated race, obstacle, or similar course. The two-wheeled vehicle 10 could be propelled by the mobile platform 60 at a scaled speed, such as in a 6:1 scaling. To facilitate the realistic simulation of two-wheeled vehicle operation, the control system could incorporate what could essentially be described as a penalty function to establish adverse effects deriving from a person's controlling the simulated two-wheeled vehicle 10 beyond what would be the performance limits of the actual vehicle being simulated. For example, where a rider imparts control signals to the two-wheeled vehicle 10 that would cause an actual vehicle to skid around a turn or to have its front or rear wheel 14 or 16 otherwise lose traction, the control system could induce the controlled two-wheeled vehicle 10 to simulate a loss in traction, to slow, or otherwise to establish a loss in performance.

A mathematical model of the foregoing embodiment is provided below. In the example, the function of the handlebars 20 is slightly simplified to provide a torque feedback that increases proportionally to the angle to which the handlebars 20 are turned. The simulated system can assume a radius of gyration of 4 feet, a trail or caster of 3 inches, and a weight of the rider and the two-wheeled vehicle of 500 lbs.

With such an arrangement, the feedback torque, the angular acceleration, and the lateral acceleration can be respectively determined by Equations 10, 11, and 12 below.

$$T = \frac{3 \text{ in}}{12 \text{ in/ft}} \cdot 250 \text{ lb} \cdot \frac{\psi}{0.1 \text{ rad}} \quad \text{(Equation 10)}$$

$$\ddot{\omega} = \frac{-T}{250 \text{ lb}} \cdot \frac{1}{4 \text{ ft}} \cdot 32 \text{ ft/s}^2 \cdot \frac{12 \text{ in/ft}}{3 \text{ in}} \quad \text{(Equation 11)}$$

$$\text{Lateral Acceleration} = 32 \text{ ft/s}^2 \left[ \tan\Theta + \frac{12 \text{ in/ft}}{3 \text{ in}} \cdot \frac{T}{250 \text{ lb}} \right] \quad \text{(Equation 12)}$$

Remote Riding Control of Two-Wheeled Vehicle

The control of a visually simulated two-wheeled vehicle and the remote control of a physical simulation of a two-wheeled vehicle undoubtedly present the user with appreciable advantages in learning, practicing, and enjoying two-wheeled vehicular function. However, other embodiments of the invention, which again can have their operation founded on the Theoretical Method of Operation described herein, can enable a user to exert control over an actual two-wheeled vehicle 10 such as that shown in FIG. 6A. There, the balance, banking, response, and other related performance characteristics of the two-wheeled vehicle 10 are entirely real in that the two-wheeled vehicle 10 is entirely freely moving and the performance of the vehicle 10 is dependent solely on the actual physics involved. The banking arrangement 35, the mobile platform 60, and all other simulative means are foregone. The two-wheeled vehicle 10 in this embodiment could be substantially any size whether in miniature, of standard size, or, albeit less likely, larger than standard size. As such, it is as if the person controlling the two-wheeled vehicle 10 is actually riding the same, although remotely.

Figure 6A:
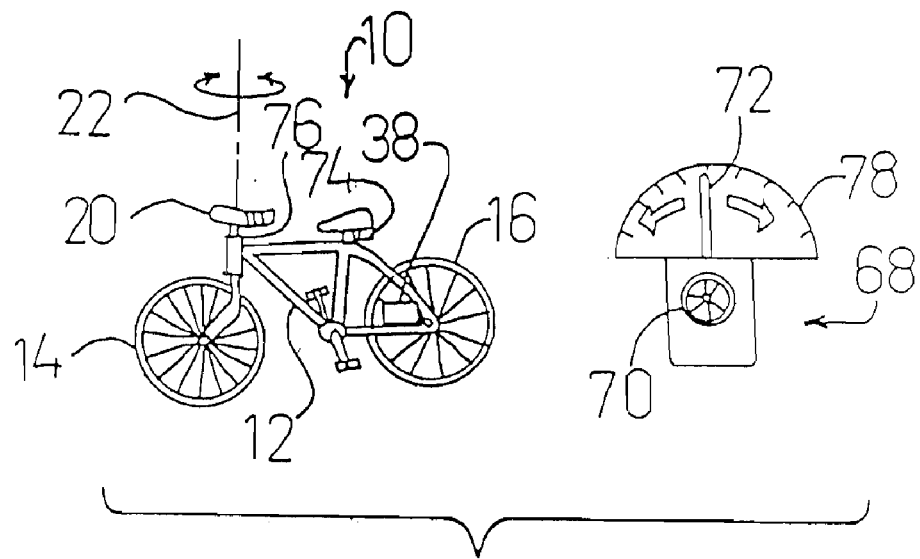
FIG. 6A is a view in side elevation of a remote riding control system for an actual two-wheeled vehicle according to the present invention.
Figure 6B:
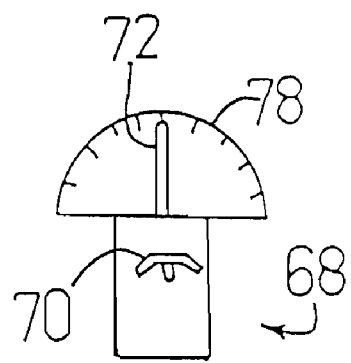
FIG. 6B is a view in front elevation of an alternative remote riding control unit.

The two-wheeled vehicle 10 can be controlled by a remote riding control unit 68, such as that included in FIG. 6A and indicated at 68 or that shown in FIG. 6B and again indicated at 68. In each case, the remote riding control unit 68 can have an indicator wand 72, which can be an actual wand or a visual representation thereof, for providing an indication of the bank angle $\theta_z$ of the two-wheeled vehicle 10 to better enable the person's control thereover. A graduated scale 78 can act as a backdrop for the indicator wand 72. A steering arrangement 70 is pivotally retained relative to the remote control riding unit 68. In FIG. 6A, the steering arrangement 70 comprises a steering wheel, and, in FIG. 6B, the steering arrangement 70 comprises a set of miniature handlebars. The two-wheeled vehicle 10 has a propulsion arrangement 38, which can be of any appropriate type, for propelling the two-wheeled vehicle 10 over a support surface. A steering torquer 76 can impart a steering torque on the steering arrangement 20 of the front wheel 14 to adjust its orientation relative to the frame 12. To facilitate the control of the two-wheeled vehicle 10, a bank angle $\theta_z$ sensor 74 can be operably associated with the two-wheeled vehicle 10. While a number of different bank angle $\theta_z$ sensors 74 would readily occur to one skilled in the art, one possible sensor 74 could comprise a sonar device.

In one manifestation of the invention, the control system, which can rely on the Theoretical Method of Operation disclosed herein, can enable a user to control the two-wheeled vehicle 10 by a simple pivoting or turning of the steering arrangement 70 with the control system providing the requisite torques on the steering arrangement 20 of the two-wheeled vehicle 10 to achieve the desired steering and other performance characteristics while maintaining the stability of the two-wheeled vehicle 10. Stated alternatively, the user can simply steer the steering arrangement 70 while the control system oversees the details of torquing the steering arrangement 20 to maintain the balance and stability of the two-wheeled vehicle 10. For example, where a user turns the steering arrangement 70 counterclockwise thereby indicating a desire that the two-wheeled vehicle 10 turn left, possibly at a given bank angle $\theta_z$, the control system can induce the chain of events required to achieve that result. To do so, for example, the control system would cause the steering torquer 76 to impart a brief clockwise torque on the steering arrangement 20 to cause it to turn briefly to the right thereby to induce the two-wheeled vehicle 10 into a roll to the left. The control system would in due course cause the steering torquer 76 to impart a counterclockwise torque on the steering arrangement 20 to ease the two-wheeled vehicle 10 into the desired turn or bank angle $\theta_z$. The two-wheeled vehicle 10 could then be assumed to reach the equilibrium described above in relation to the present inventor's Theoretical Method of Operation. The user could then impart further torques on the steering arrangement 70 to cause the control system to disturb the equilibrium. Of course, infinite control signal scenarios are possible with the basic premise being that the control system could exploit the Theoretical Method of Operation to maintain the two-wheeled vehicle 10 in stable motion. The control system can comprise a second order servo loop, which can be critically damped or possibly overdamped as it controls the steering and balance of the two-wheeled vehicle.

In an alternative manifestation of the invention, the control system's maintenance of the stability of the two-wheeled vehicle 10 could be dispensed with entirely or could operate only as a safety mechanism such that a user would be called upon to control every nuance of two-wheeled vehicle operation in seeking to control the two-wheeled vehicle 10 while maintaining its stability. With this, the user seeking to induce the left hand turn described above would be required actually to impart the clockwise torque to induce the roll and then the counter-clockwise torque to achieve stability, and the user simply seeking to maintain a straight traveling two-wheeled vehicle in stability would need to impart the corrective torques on the steering arrangement 70, and thus on the steering arrangement 20, that are inherently required to maintain a two-wheeled vehicle 10 in stable motion. The steering arrangement 70 could exhibit torques in proportion to or reproductive of the torques that would actually be produced by a steering arrangement in an actual vehicle undergoing the same motion. In controlling the two-wheeled vehicle 10, the user can have reference to the two-wheeled wheeled vehicle 10 and/or to the indicator wand 72 to perceive the present bank angle $\theta_z$ of the two-wheeled vehicle 10.

Under such an arrangement, one can assume that the two-wheeled vehicle 10 could undertake a maximum 0.5 G turning event. One can also assume an 18 inch wheelbase, a trail of 1.5 inches, a weight of 5 lbs, and a radius of gyration of 1 foot. The maximum angular acceleration can be calculated employing Equation 13 below.

$$\ddot{\theta}_{max} = 32 ft/s^2/1\ ft = 32\ rad/s^2 \quad \text{(Equation 13)}$$

For greater stability, one can operate under one-half of the maximum angular acceleration, which is 16 rad/s².

In the system controlled embodiment where one merely steers and the system ensures stability, a critically damped second order servo loop can be assumed to have an angular acceleration derived as set forth below in Equation 14.

$$\ddot{\theta} = -16(\theta - \theta_c) - 8\dot{\theta} \quad \text{(Equation 14)}$$

Where,

T is the handlebar torque on the two-wheeled vehicle 10;

$\theta_c$ is the commanded angle (the desired angle).

In a system where the user entirely controls the steering and balance of the two-wheeled vehicle except for any backup provided by the system, the limits at which the system intervenes to prevent leaning beyond a predetermined limit (in this case approximately 30 degrees or 0.5 radians) are determined by Equations 15 and 16 below. In this system, the torque imparted on the steering arrangement 20 can be proportional to that imparted on the steering arrangement 28.

$$\dot{\theta} > 0 : \text{Limit} = \dot{\theta} < \sqrt{32 \cdot \left(\frac{1}{2} - \theta\right)} \quad \text{(Equation 15)}$$

$$\dot{\theta} < 0 : \text{Limit} = \dot{\theta} > -\sqrt{32\left(\theta + \frac{1}{2}\right)} \quad \text{(Equation 16)}$$

Rider Controlled Two-wheeled Vehicle Motion Simulation with Mobile Platform

Figure 8A:
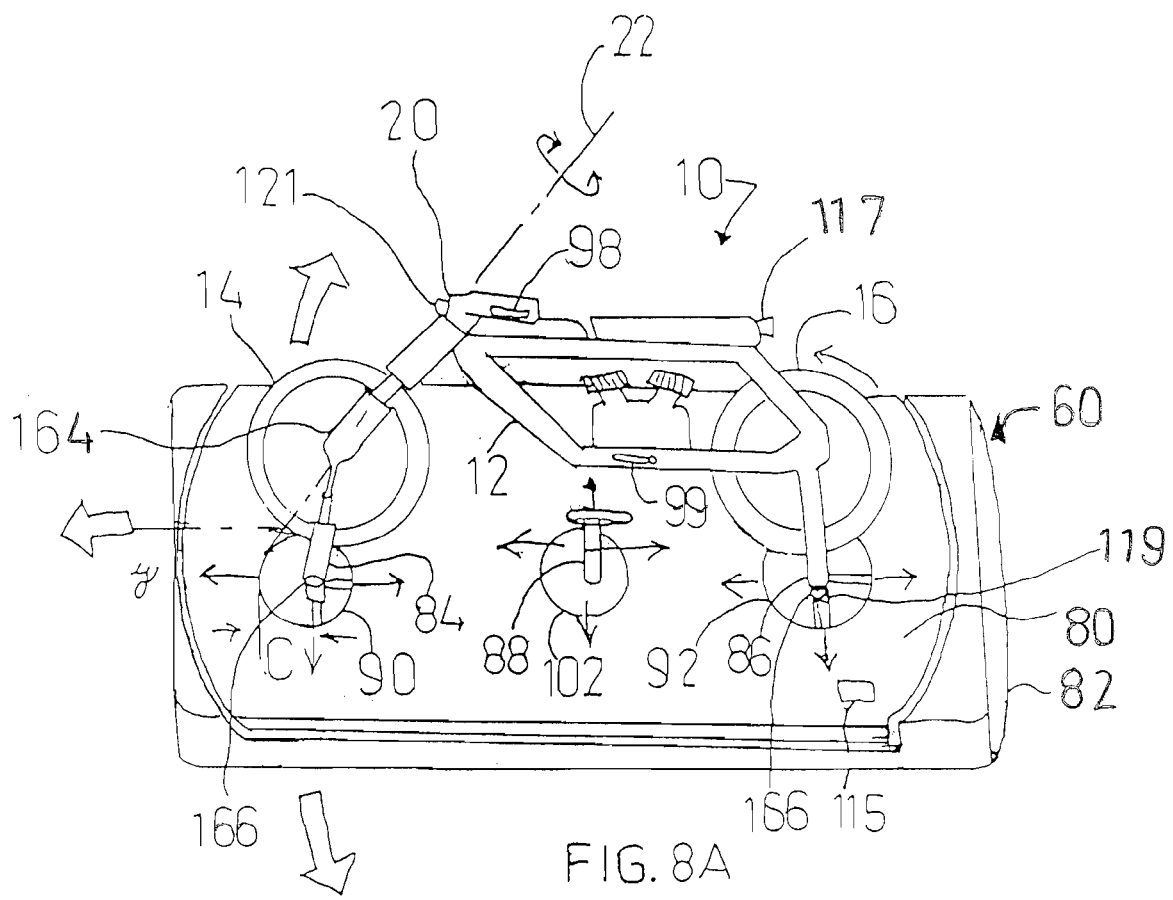
FIG. 8A is a perspective view of a flat tracker two-wheeled vehicle motion simulation platform according to the present invention.
Figure 8B:
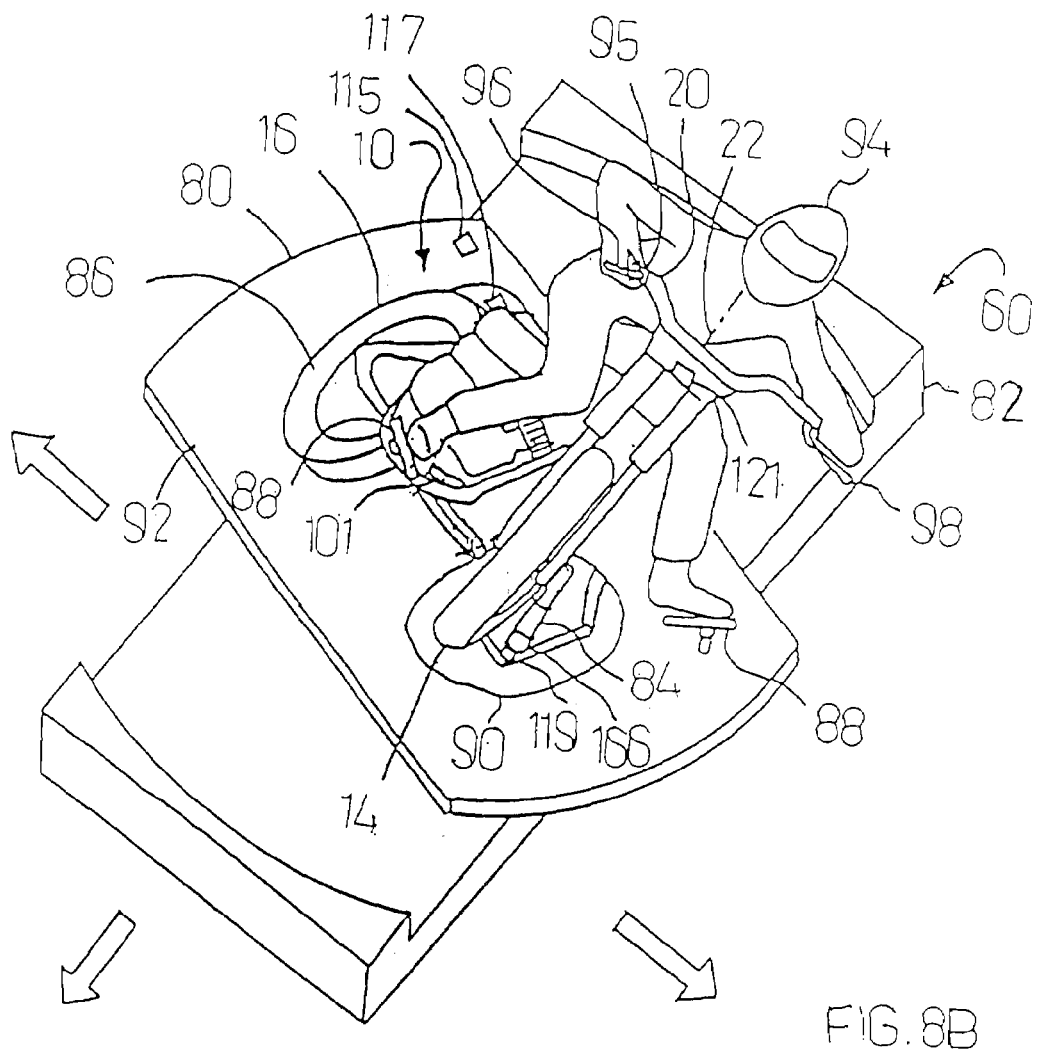
FIG. 8B is a perspective view of the flat tracker two-wheeled vehicle motion simulation platform of FIG. 8A in simulation of flat tracker two-wheeled vehicular motion.

A further embodiment of the invention is depicted, for example, in FIGS. 8A and 8B in the form of a rider controlled two-wheeled vehicle 10 mounted on a mobile platform 60 for actually being ridden by a rider 94. In this example, the two-wheeled vehicle 10 simulates a flat tracker motorcycle, and the mechanical and control details of the embodiment have a number of aspects that can be considered to be particularly advantageous for simulating such a vehicle. It will be readily appreciated, however, that the particular two-wheeled vehicle 10 simulated can vary widely within the scope of the invention.

The two-wheeled vehicle 10 has simulative front and rear wheels 14 and 16 that can be rotatably retained relative to its frame 12. A steering arrangement 20 comprising handlebars pivots about a steering axis 22. An accelerator 95 is incorporated into a first handle portion of the steering arrangement 20 for enabling the rider 94 to impart a signal to the control system to impart a simulated acceleration to the two-wheeled vehicle 10, which could cause the rear wheel 16 to increase its angular velocity and/or cause the control system to calculate and accommodate what the acceleration would be in an actual two-wheeled vehicle and its effects on the performance of the simulative two-wheeled vehicle 10. The front and rear wheels 16 can be caused to rotate and change speeds of rotation to provide a most realistic simulation of motion and to create the gyroscopic forces that would be exhibited by the wheels 14 and 16 during that motion. Alternatively, the system could merely calculate the speeds, accelerations, and resulting effects that would actually derive from a spinning of the front and rear wheels 14 and 16. Additionally, a braking means, such as a hand braking lever 96 can be disposed on the steering arrangement 20 to enable the rider 94 to impart actual and simulated braking forces to be perceived and accommodated by the control system and, possibly, the front wheel 14 and, additionally or alternatively, the rear wheel 16. A foot brake 99 can also or alternatively be provided for providing actual and/or simulated braking to the rear wheel 16. A clutch lever 98 and a shifting lever 101 can cooperate to enable a rider to engage in a simulated shifting of gears of the two-wheeled vehicle.

The two-wheeled vehicle 10 is retained relative to the mobile platform 60 by means for enabling the two-wheeled vehicle 10 to tilt through bank angles $\theta_z$ relative to the platform 60 in simulation of actual vehicular motion and performance. In the depicted example, the means for enabling the two-wheeled vehicle 10 to be tilted comprises a forward support rod 84 that has a first end fixed to the steering fork 164 and a second end pivotally retained relative to the mobile platform 60, such as by a ball joint 166, along with a rearward support rod 86 that has a first end fixed to the frame 12 and a second end pivotally retained relative to the mobile platform 60, such as by a ball joint 166. The ball joint 166 can preferably be vertically and horizontally located such that the two-wheeled vehicle 10 would tilt about a roll axis y as it would in actual operation that is horizontally aligned with the plane of the two-wheeled vehicle and that is approximately equivalent in vertical location to what would be the height of the contact points of the front and rear wheels 14 and 16 with a support surface. The forward support rod 84 and the rearward support rod 86 and the associated ball joints 166 can be supported and moved by a quick response motion arrangement 150, which is depicted schematically in FIG. 8C.

Figure 8C:
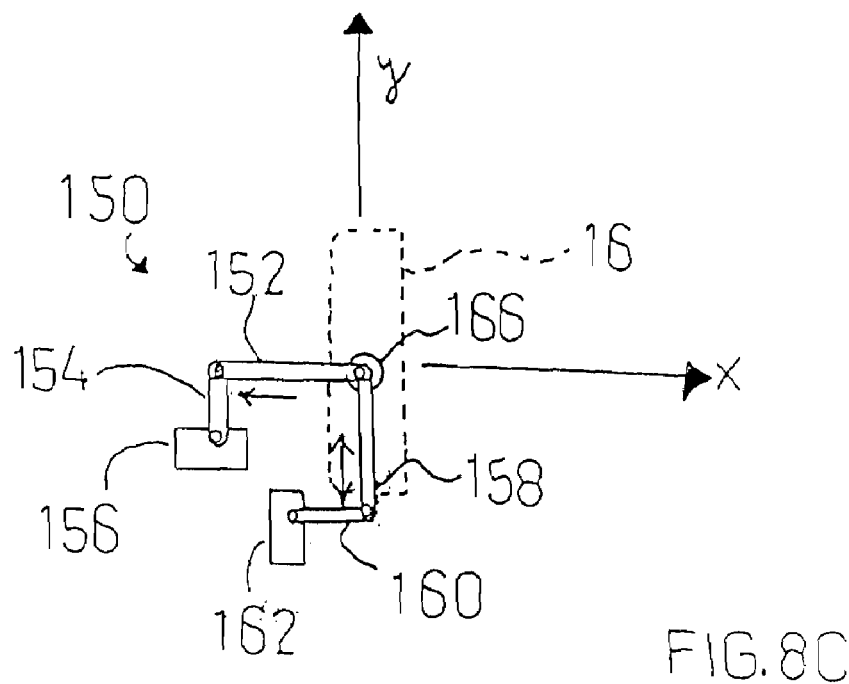
FIG. 8C is a schematic top plan view of a quick response motion arrangement pursuant to the present invention.

As can be seen most clearly in FIG. 8C, the quick response motion arrangement 150 can have first and second motion portions respectively founded on a torquing motor 156 or 162. The torquing motor 156 drives a proximal control arm 154 that in turn drives a distal control arm 152. Similarly, the torquing motor 162 drives a proximal control arm 160 that in turn drives a distal control arm 158. The forward support rod 84 and the associated ball joint 166 and quick response motion arrangement 150 operate within the bounds of a support well 90 in the mobile platform 60. Likewise, the rearward support rod 86 and the associated ball joint 166 and quick response motion arrangement 150 operate within the bounds of a support well 92 in the mobile platform 60. Under this arrangement, the two-wheeled vehicle 10 is free to pivot about the roll axis y by use of the ball joints 166. The quick response motion arrangements 150, therefore, can impart forces along and between the x and y directions.

Those forces would, in turn, affect and create the operation of the two-wheeled vehicle 10, such as by creating and adjusting bank angles $\theta_z$ and the like in response to control inputs provided by the rider 94. In any case, the forward support rod 84 could be extensible and retractable to enable the two-wheeled vehicle 10 to be pitched to simulate a hill-climbing orientation. The ball joint 166 about which the forward support rod 84 pivots will preferably be disposed rearward of the point at which the axis of rotation 22 of the steering arrangement 20 would intersect the same horizontal plate such that a caster or trail is ensured so that the two-wheeled vehicle 10 can operate and be controlled pursuant to the Theoretical Method of Operation described herein.

With combined reference to FIGS. 8A and 8B, one can perceive that the mobile platform 60 can be formed by an upper platform 80 that is pivotally retained relative to a base platform 82. Under such an arrangement, the upper platform 80 can pivot relative to the base platform 82 to enable an accurate simulation of further two-wheeled vehicle riding conditions, such as the lateral sliding of a rear wheel 16 deriving from an intentional or unintentional loss of traction of the rear wheel 16 relative to a support surface. For example, with such a pivoting as is depicted in FIG. 8B, a rider 94 can realistically recreate the intentional kicking out of the rear end of a motorcycle that is integral to flat track motorcycle racing. The system can incorporate sensors, such as inertial sensors 115, for detecting the linear and angular accelerations of the upper platform 80 and, derivatively, the two-wheeled vehicle 10. The inertial sensors 115 could be coupled to the mobile platform 60 and/or directly to the two-wheeled vehicle 10. Weight distribution and the overall force of the two-wheeled vehicle 10 can be detected by any suitable means, including, by way of example, load cells 119 disposed at the bases of the forward and rearward support rods 84 and 86. Of course, there also can be means, such as a sensing unit 117 for sensing the bank angle $\theta_z$, angle of incline, acceleration, and other parameters relating to the disposition and movement of the two-wheeled vehicle 10. The system would further detect the angular disposition, or angle of attack, of the front wheel 14 by a sensing unit 121. Of course, such sensors or detectors could be provided in a single unit or as multiple separate units.

The ability of the system to provide a user with a still more complete imitation of two-wheeled vehicle operation, foot members 88 can engage the feet of the rider 94 to sense any amount of force that the rider 94 might seek to apply to the support surface and, possibly, to impart a corresponding opposing force on the rider's foot. The system can sense the applied force by the rider's foot and can give that force a representative effect in the performance, such as the simulated sliding, of the two-wheeled vehicle 10. As FIG. 8A shows, the foot members 88 can extend from retaining wells 102. Alternatively, where greater motion may be necessary or desirable, the foot members 88 can be freely movable by being retained relative to the feet of the rider 94. In either case, the foot members 88 can incorporate extensible and retractable arrangements or other means for enabling movement for providing representative forces to the rider 94 through his or her feet.

Figure 8D:
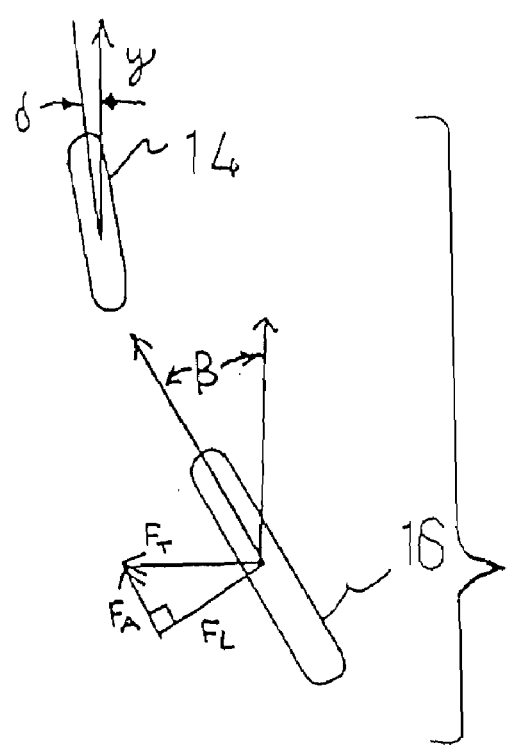
FIG. 8D is a schematic top plan view depicting the force relationships of a spinning rear wheel of a two-wheeled vehicle.

As FIG. 8B depicts most clearly, the two-wheeled vehicle 10 of this embodiment can simulate the sliding out of the rear wheel 16 of the vehicle 10 as is commonly the case during flat tracker racing and the like. The system of the present invention can factor in the physics of such a maneuver as exemplified in FIG. 8D, which schematically depicts the general disposition of the vehicle 10 in FIG. 8B. There, the front wheel 14 has an angle of attack aligned with the path of travel y of the vehicle 10. The rear wheel 16 is slid out from that path of travel by an angle $\beta$ either by excessive braking or acceleration. When the rear wheel 16 is so disposed, a total vector force $F_T$ will act on the tire. The total vector force $F_T$ represents the sum of what can be termed an acceleration force $F_A$, which can be positive, negative, or zero and which is directly parallel to the orientation of the rear wheel 16, plus the lateral force $F_L$ acting on the rear wheel 16 as it slides over the support surface. Employing the same concept in relation to the front wheel 14, the lateral force $F_L$ can be calculated to equal $((F_T)(\delta))/(0.1 \text{ rad})$ where $\delta$ is the slip angle. Where the absolute value of $\delta$ or $\beta$ exceeds 0.1 rad (6 degrees), one can assume that the relevant wheel 14 or 16 follows the aforedescribed sliding or skid model. Where $\delta$ or $\beta$ is less than 0.1 rad, then the system would calculate two proposed $F_L$'s, namely $$\frac{F_T \cdot \delta}{0.1 \text{ rad}} \text{ or } \frac{F_T \beta}{0.1 \text{ rad}}$$

and $\sqrt{F_T^2 - F_A^2}$ (for each wheel) and then uses whichever is least. Employing this knowledge, the two-wheeled vehicle 10 can simulate actual vehicular motion still more closely.

Figure 9:
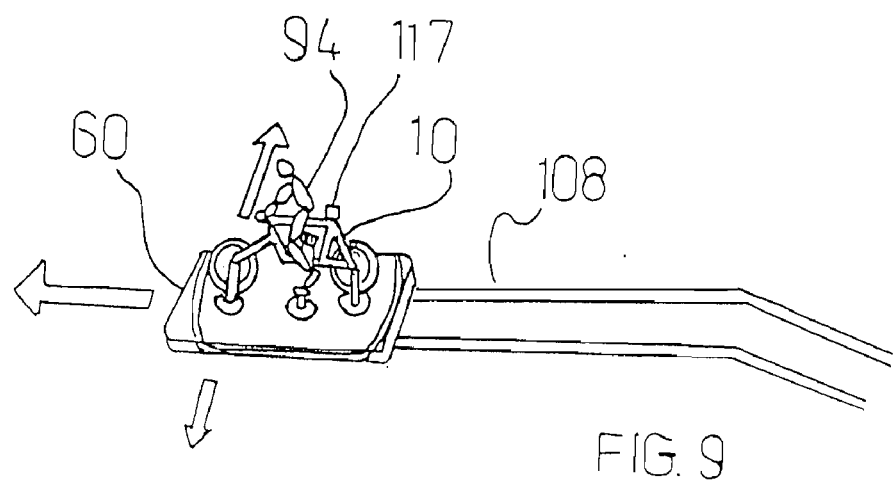
FIG. 9 is a perspective view of a flat tracker two-wheeled vehicle motion simulation platform configured for travel on rails.
Figure 10:
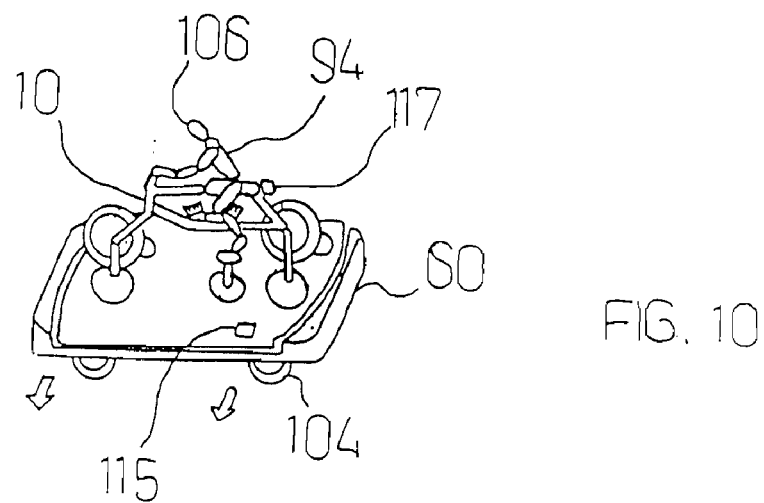
FIG. 10 is a perspective view of a flat tracker two-wheeled vehicle motion simulation platform configured for travel over land.

In any case, the mobile platform 60 can incorporate means for moving the mobile platform 60. As one skilled in the art will appreciate, the means for moving the mobile platform 60 could take substantially any form. For example, the means for moving the mobile platform 60 can comprise a means for moving the mobile platform 60 over a solid surface, such as wheels 104, which are preferably steerable, as is shown in FIG. 10. Alternatively or additionally, the means for moving the mobile platform 60 could comprise a means for moving the mobile platform 60 over a water surface, such as the propeller 112 depicted in FIG. 11. Still further, the means for moving the mobile platform 60 could comprise rails 108 as shown in FIG. 9. The simulation could be rendered still more realistic by a means for enabling a limited lateral movement of the mobile platform 60 relative to the rails 108. Under such an arrangement, the two-wheeled vehicle 10 could simulate two-wheeled vehicle motion in an amusement park or substantially any other environment.

Figure 11:
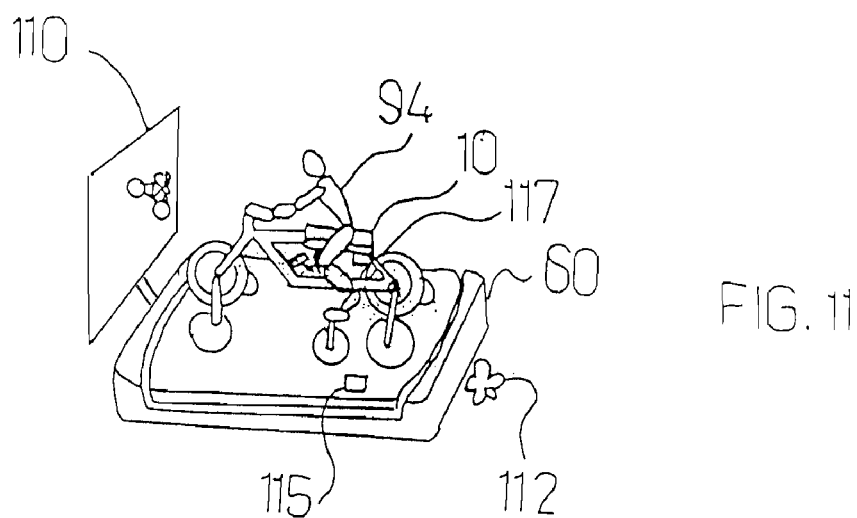
FIG. 11 is a perspective view of a flat tracker two-wheeled vehicle motion simulation platform configured for travel on water.

In an even further possible refinement of the invention, the system could incorporate display means for providing a visual simulation to the rider 94 while he or she is experience a physical simulation of movement by operation of the two-wheeled vehicle 10 and the mechanisms associated therewith. For example, as FIG. 10 shows, the rider 94 could be provided with virtual reality goggles 106. As FIG. 11 shows, a rider 94 could alternatively be provided with a display screen 110. In either case, the display means can provide the rider 94 with a simulated scene through which he or she can seek to maneuver the two-wheeled vehicle 10.

With such a display means provided, the two-wheeled vehicle 10 could be used in one application for enabling a rider 94 to practice and learn the requirements necessary for maneuvering a two-wheeled vehicle during actual operation thereof in truly accurate virtual reality. For example, in one practice of the invention, motion could be simulated additionally by use of the display means. As such, apparent speed by use of the display means could supplement the actual speed and movement of the two-wheeled vehicle 10 and the platform 60. The mobile platform 60 could demonstrate limited movement while the display means gives the rider 94 the perception of moving at a high rate of speed, such as 50 mph, at which avoiding obstacles requires skill and experience of a level commonly not possessed by novice riders. A rider 94 presented with obstacles, control instructions or indications, or the like would be required to steer the simulated two-wheeled vehicle 10 to avoid the simulated obstacles and the like, which approach the rider 94 at the simulated speed. The rider 94 could, therefore, learn how to induce a turn in a given direction (i.e., by first turning in the opposite direction to induce vehicle roll and then countersteering as necessary to achieve stable motion) while in the safety and repeatability of a simulated environment. In each application of this embodiment of the two-wheeled vehicle 10, the front and rear wheels 14 and 16 could rotate as they would at the simulated speed to give the gyroscopic and other effects that would actually derive therefrom.

In any case, with such a two-wheeled vehicle 10 arrangement, a rider 94 can be provided with a realistic simulation of the movement of a two-wheeled vehicle 10, such as the motion of a flat tracker motorcycle over a ground surface. Advantageously, the rider 94 can gain such an experience without the skill and danger that are substantially inherent in flat tracker racing and similarly aggressive riding of a two-wheeled vehicle. By the combined effects of the quick responsive movements deriving from the quick response motion arrangements 150 and, possibly, the gross vehicular movements of the mobile platform 60, the system can impart on the rider 94 a realistic simulation of the forces that would be experienced during actual riding. For example, where a rider 94 twists the accelerator 95 to induce an accelerative effect on the two-wheeled vehicle 10, the quick response motion arrangements 150 can induce a quick response movement of the two-wheeled vehicle 10 by moving the ball joints 166 and, therefore, the support rods 84 and 86 within the retaining wells 90 and 92 to give the rider 94 a perception that the two-wheeled vehicle 10 has begun accelerating. Substantially simultaneously, the mobile platform 60 can be induced into motion to continue imparting the perception of acceleration in a gross movement. When possible without substantially interfering with the desired simulation, the forward and lateral support rods 84 and 86 can return to their original or other dispositions to enable the greatest latitude in subsequent quick response movement. Furthermore, with the two-wheeled vehicle 10 in simulated motion, a rider 10 who turns the steering arrangement 20 will induce the quick response motion arrangements 150 into operation through the control system to cause them to impart corresponding lateral forces on the ball joints 166, which represent the contact points of the two-wheeled vehicle 10 with the support surface. The applied forces will yield the torques, angular speeds and accelerations, and bank angles $\theta_z$ that would be experienced in an actual vehicle at the simulated speeds and movements. Of course, those applied forces will preferably be determined by the control system in reliance on the Theoretical Method of Operation set forth herein to yield the correspondingly predictable vehicular responses.

Gyroscopically Stabilized Two-Wheeled Transportation Vehicle

Figure 12:
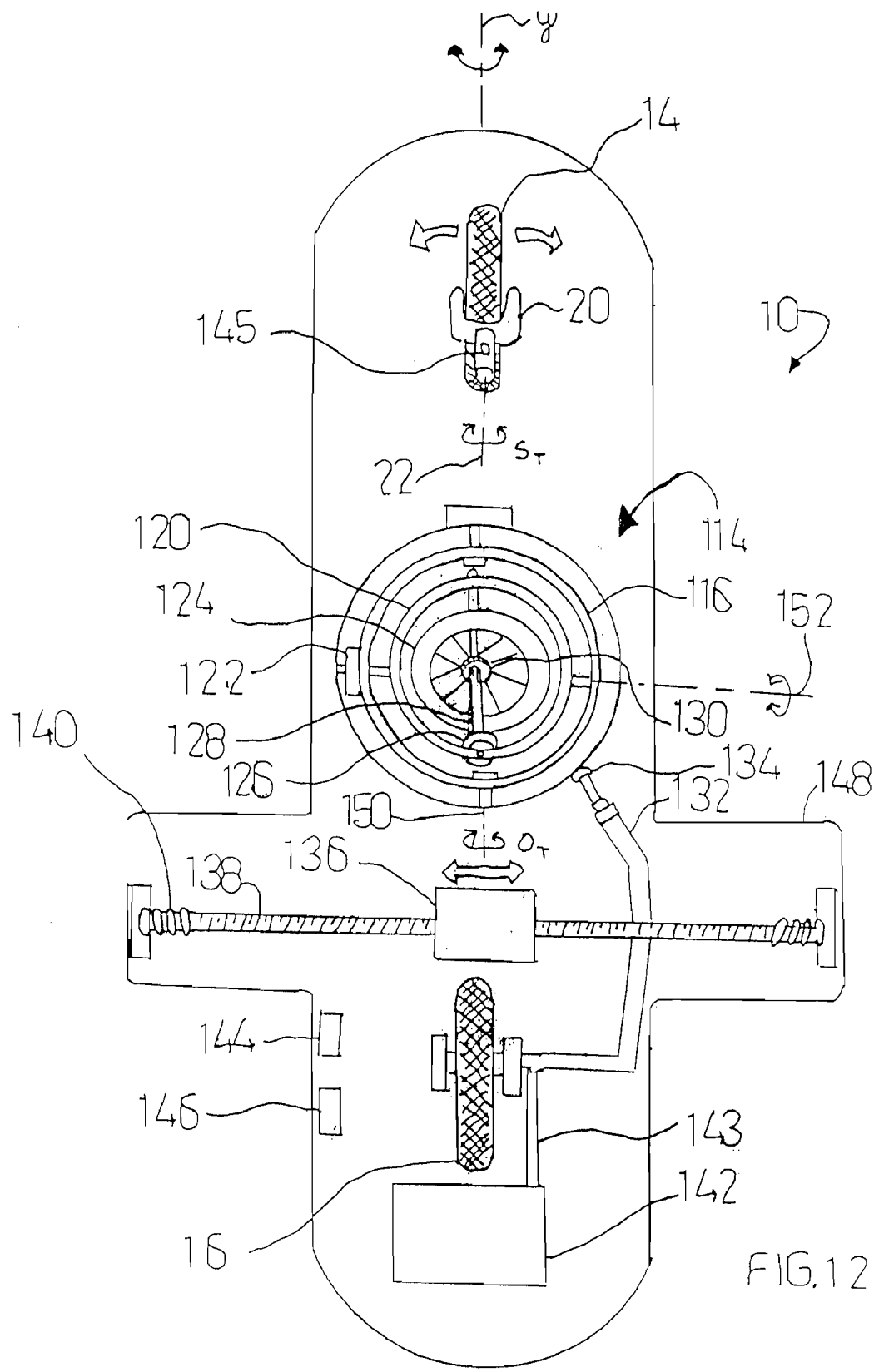
FIG. 12 is a schematic top plan view of a gyroscopically stabilized two-wheeled vehicle pursuant to the present invention.
Figure 13:
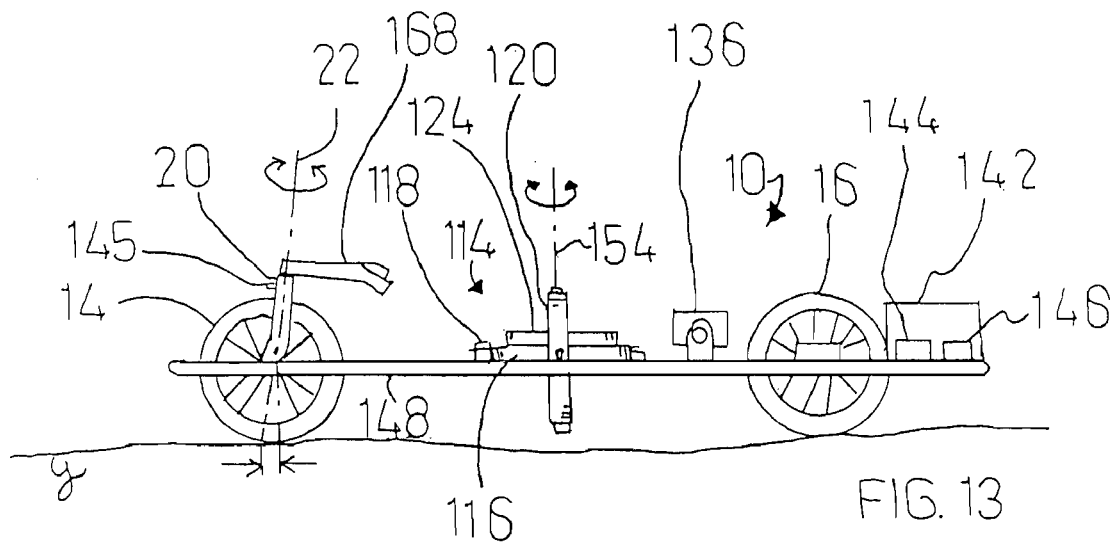
FIG. 13 is a view in side elevation of the gyroscopically stabilized two-wheeled vehicle of FIG. 12.
Figure 14:
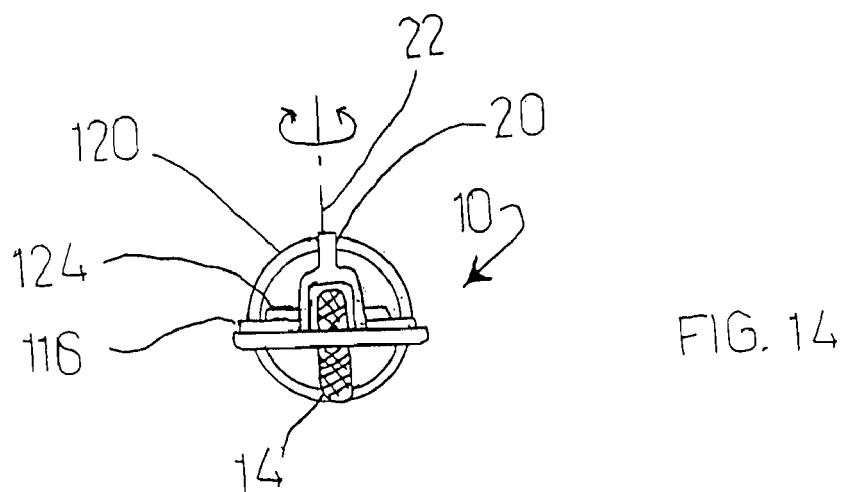
FIG. 14 is a view in front elevation of the gyroscopically stabilized two-wheeled vehicle of FIG. 12.
Figure 15:
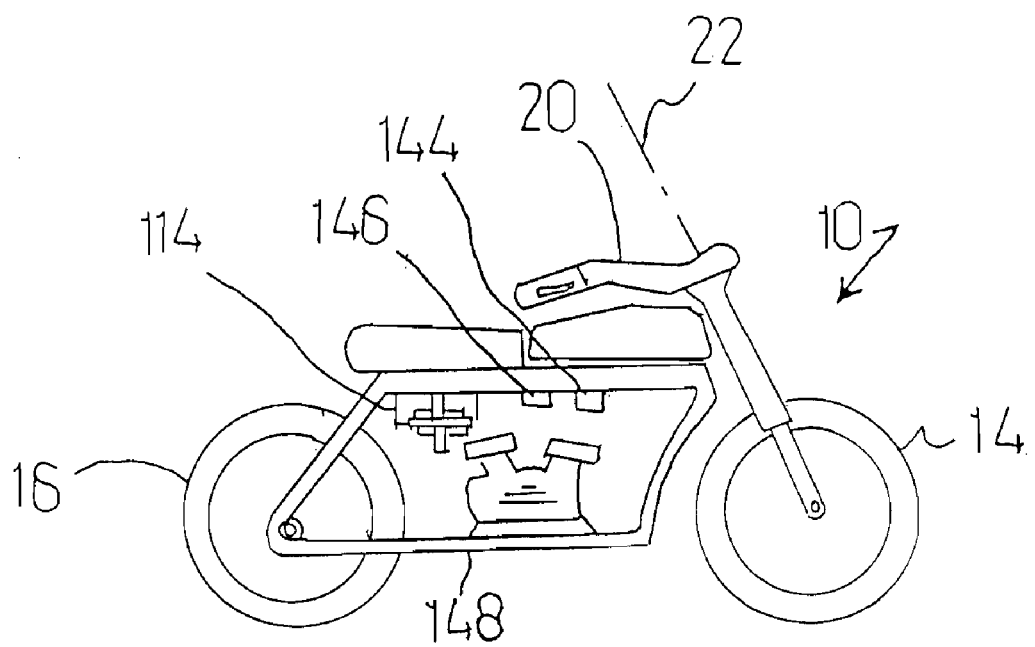
FIG. 15 is a view in side elevation of an alternative gyroscopically stabilized two-wheeled vehicle.

The present invention can alternatively be embodied in a two-wheeled transportation vehicle 10 as is depicted schematically in FIGS. 12 through 14. There, the two-wheeled vehicle 10 is founded on a chassis 148 that rotatably retains front and rear wheels 14 and 16. The front wheel 14 is retained by a steering arrangement 20 to pivot about a steering axis 22. The steering arrangement 20 can be directly or indirectly controlled by a steering control 168, which could comprise a set of handlebars, a steering wheel, or any other appropriate arrangement. A propulsion arrangement 142 provides propulsive power to the rear wheel 16 through a force transmission arrangement 143. The two-wheeled vehicle 10 can be considered to travel along the depicted y axis and can, in certain practices of the invention, be deemed to roll about the y axis as well such that the y axis can be considered to be the roll axis of the two-wheeled vehicle 10.

A stabilizing gyroscope 114 can be retained relative to the chassis 148 for imparting stabilizing torques on the two-wheeled vehicle 10 as will be described more fully herein. The gyroscope 114 could vary within the scope of the invention. In this example, the gyroscope 114 comprises a two-gimbaled arrangement. An outer gimbal 116 is coupled to the chassis 148 to pivot about an outer gimbal axis 150 that is parallel to the roll axis y. An inner gimbal 120 is coupled to the outer gimbal 116 to pivot about a gimbal axis 152 that is perpendicular to the gimbal axis 150 of the outer gimbal 116 and, therefore, perpendicular to the roll axis y of the two-wheeled vehicle 10. A gyro wheel 124 is rotatably retained relative to the inner gimbal 120 by a spindle 128 with an axis of rotation 154 perpendicular to the gimbal axis 152 of the inner gimbal 120.

An outer gimbal torquer 118 can torque the outer gimbal 116. An inner gimbal torquer 122 can torque the inner gimbal 120. A gyro wheel rotation unit 126 can maintain and adjust an angular velocity of the gyro wheel 124. In certain embodiments, the gyro wheel rotation unit 126 could be the sole means for bringing the gyro wheel 124 up to a desired angular velocity and for otherwise adjusting and maintaining any angular velocity. Alternatively, the gyro wheel 124 could be initially and/or periodically accelerated by a supplementary rotation means. For example, in the embodiment of FIG. 12, the propulsion arrangement 142 for the overall two-wheeled vehicle 10 could additionally be employed to provide an initial angular velocity to the gyro wheel 124, such as by a means for temporarily producing a driving engagement between the propulsion arrangement 142 and the gyro wheel 124. Of course, numerous different means could be conceived of by one skilled in the art after reading this disclosure. All such means are within the scope of the present invention. In this example, the means comprises an extensible and retractable drive arm 132 with a drive gear 134 disposed at a distal end thereof that is driven by the propulsion arrangement 142 in combination with a driven gear 130 fixedly retained relative to the gyro wheel 124 and/or the spindle 128.

An example of such an arrangement can be provided as follows. The gyro wheel 124 has a mass of 200 pounds, a 1 foot radius, and a rim speed of 320 feet/sec, which equals an angular speed of 320 rad/s. The energy in the flywheel is $(200 \text{ lbs})(320 \text{ ft/s/8})^2 = 320{,}000$ ft lbs of energy.

Assuming a propulsion arrangement 142 of 20 horsepower, the gyro wheel 124 can be revved to full speed in $(320{,}000 \text{ ft lb})/(11{,}000 \text{ ft lb/s}) = 30$ seconds.

To establish an analysis of whether such a system would tolerate a worst case (or most demanding) test of having the vehicle 10 disposed in a 1 G turn in a first direction and then seeking to have the vehicle 10 turn to a full 1 G turn in the opposite direction instantaneously, one can calculate with the following characteristics: a vehicle mass of 600 pounds centered 1 foot off of the support surface; a ballast weight of 200 pounds centered at 1.5 feet off of the support surface; a 6 foot ball screw or drive rod 138; the vehicle 10 is initially leaned 0.3 radian; maximum ballast acceleration is 32 ft/s$^2$; maximum gyro torque is 3,000 ft lbs; and ballast is initially disposed fully to the left. The initial torque necessary to maintain lean angle is calculated as follows: 600 ft lb from ballast position +300 ft lb from ballast height +300 ft lb from ballast acceleration +600 ft lb from mass of vehicle at 1 foot +300 ft lb from vehicle at 0.3 radian lean 2,100 ft lb. Therefore, this leaves a surplus 900 ft lbs for producing an angular acceleration of the vehicle 10 about the roll axis. When ballast fully extended initially, the moment of inertia initially will be 600 pounds at 1 foot from the vehicle +200 pounds at 3.5 feet from the ballast giving approximately 2,000 lb ft$^2$. Dividing the surplus torque of 900 ft lbs by the moment of inertia of 2,000 lb ft$^2$ and multiplied by gravity or 32 ft/s$^2$ gives approximately 14 rad/s$^2$. With this, one can assume that the vehicle 10 can withstand the demanded change in disposition and will reach a vertical center position in approximately 0.25 seconds and a steady state 1 G turn in approximately 0.5 seconds. The ballast 136, which travels slightly slower, will take approximately 0.75 seconds to reach the right side of the vehicle 10.

The balance, stability, and maneuverability of the two-wheeled vehicle 10 can be further achieved and maintained by a laterally movable ballast 136. The ballast 136 could, of course, be of any effective size, weight, and configuration. Also, the means for laterally moving the ballast 136 could be of any functional type. In the depicted embodiment, the means for laterally moving the ballast 136 comprises a drive rod 138 disposed perpendicularly to the roll axis y of the two-wheeled vehicle 10 across the chassis 148. The means for selectively reciprocating the ballast 136 along the drive rod 138 could, for example, comprise a threaded engagement therebetween in combination with a means for rotating the drive rod 138 and/or all or part of the ballast 136. Resiliently compressible members 140 could be disposed at the opposed ends of the drive rod 138 for providing any necessary cushioning.

To facilitate the control, maneuverability, and stability of the two-wheeled vehicle 10, sensors can be provided to perceive, for example, the bank angle $\theta_z$, roll and roll acceleration rates, and other performance characteristics and conditions of the two-wheeled vehicle. For example, in one embodiment, the two-wheeled vehicle 10 can have a vertical gyro 144 to sense the bank angle $\theta_z$ and a rate gyro 146 to sense roll and roll acceleration rates. Again, these and further sensors could be incorporated into a single unit or as multiple units.

Another possible embodiment of the gyroscopically stabilized two-wheeled vehicle 10 is depicted in FIG. 10. There, the two-wheeled vehicle 10 takes the form of a motorcycle. A vertical gyro 144 and a rate gyro 146 could again indicate the bank angle $\theta_z$ and roll and roll acceleration rates. A stabilizing gyro 114 could again be included. In this embodiment, however, the stabilization gyro 114 could be sized and controlled to provide full stability to the two-wheeled vehicle 10. Alternatively, it could be sized and controlled merely to provide assistive torques as the rider seeks to maintain the two-wheeled vehicle 10 in balance and control.

In operation, the control system can employ the stabilization gyro 114 and, if necessary, the ballast 136 to provide stability and maneuverability to the two-wheeled vehicle 10, ideally exploiting the Theoretical Method of Operation described herein. In one operation of this embodiment of the two-wheeled vehicle 10, the control system can exploit the stabilization gyro 114 and the ballast 136 to cause the two-wheeled vehicle to maintain a generally upright orientation such that it will handle as though it were a four-wheeled car. The system can employ the vertical gyro 144 to sense the bank angle $\theta_z$ and the rate gyro 146 to sense roll and roll acceleration rates and can impart any necessary force by use of the stabilizing gyro 114 to maintain the two-wheeled vehicle 10 in a generally vertical disposition. Where necessary, the system can additionally move the ballast 136 to change the effective center of gravity of the two-wheeled vehicle 10 to further affect the vehicle's balance and to minimize the force demanded of the stabilizing gyro 114. The two-wheeled vehicle 10 can provide a force feedback to the user through the steering control 168 by causing or allowing the steering control 168 to exhibit a steering torque proportional to the lateral forces being experienced relative to the front wheel 14.

Alternatively, the control system can generally allow the two-wheeled vehicle 10 to operate in what can be termed a motorcycle-handling embodiment where the vehicle 10 banks and rolls as one would expect of a typical two wheeled vehicle devoid of a stabilizing gyroscope 114. In such an embodiment, the stabilizing gyroscope 14 and, possibly, the ballast 136 could be induced to intervene and provide the two-wheeled vehicle 10 with stabilizing or performance assistance only when necessary to maintain or return to normal two-wheeled vehicular operation. Stated alternatively, the stabilizing gyroscope 14 and the ballast 136 could be employed only when the two-wheeled vehicle 10 demonstrates a deviation from expected banking or other performance characteristics and responses. The system could employ a mathematical model to predict what performance characteristics and responses should be demonstrated in each given circumstance. For example, the system can predict, such as by use of the Theoretical Method of Operation described herein, what roll rate or acceleration should be experienced during a coordinated turn, in response to a torquing of the steering arrangement 20, as a result of a change in weight distribution, and/or any other possible situation or input. Where the roll rate or roll acceleration does not match the predicted result, the system can initiate the stabilizing gyro 114 and/or the ballast 136 to impart corrective action.

A number of exemplary conditions can be described where a deviation from expected operation would occur and would induce the intervening operation of the stabilizing gyro 114 and/or the ballast 136. Under what can be termed Abnormal Condition A, the two-wheeled vehicle 10 is in a turn at a given bank angle. The control system of the present invention, which can incorporate an inertial platform, senses a roll acceleration happening to the two-wheeled vehicle 10 while no torque is being applied to the steering arrangement 20 by the vehicle occupant. Bearing in mind the equilibrium predicted by the Theoretical Method of Operation, the roll acceleration can be assumed to be symptomatic of a slippage of the two-wheeled vehicle 10. The system then can trigger a righting torque by the stabilizing gyro 114 until the system senses that the two-wheeled vehicle 10 is operating as expected, which indicates a steady state turn at the traction available.

Under what can be considered Abnormal Condition B, a two-wheeled vehicle 10 can be assumed to be leaned in a turn with the vehicle's occupant wishing to come out of the turn. The occupant would then impart a torque on the steering arrangement 20 to seek to cause the vehicle 10 to turn deeper into the turn. While such an action should induce a roll acceleration tending to right the vehicle 10, it does not under Abnormal Condition B. Such a failure will be demonstrated as a roll rate that is incongruous with that predicted by the control system. The system can, therefore, assume that the front wheel 14 has begun to slip. The system can then intercede with the operation of the stabilizing gyro 114 to provide a righting torque to achieve the desired result. The system can perceive the roll rate that was sought based on the torquing of the steering arrangement 20 and can cause the vehicle to achieve that roll rate. In certain cases, the system could additionally resist allowing the occupant to steer undesirably still deeper into the turn as can sometimes be the response of an occupant experiencing such slipping.

In Abnormal Condition C, a two-wheeled vehicle 10 is excessively braked or accelerated thereby causing a loss in traction in one or both wheels 14 and/or 16. Such a loss in traction would present itself in the form of a roll rate increase without an occupant's corresponding torquing of the steering arrangement 20. In response, the system can induce the stabilizing gyro 114 to impart a corrective torque, whether to roll the vehicle 10 to a vertical disposition, to place the vehicle 10 in the pre-slip bank position, or something in between.

Finally, in Abnormal Condition D, the vehicle 10 experiences what is commonly referred to as high siding. In high siding, one or both wheels 14 and/or 16 catches or otherwise experiences a sharp increase in lateral force thereby inducing a rapid, normally righting, roll acceleration. The system can induce the stabilizing gyro 114 to impart a torque minimizing or eliminating unintentional roll.

With a plurality of exemplary embodiments of the present invention disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also equivalents thereof.

The invention claimed is:

1. A rider controlled two-wheeled vehicular motion simulation arrangement comprising:
a mobile platform;
a simulated two-wheeled vehicle with a frame, a front wheel rotatably retained relative to the frame, a rear wheel rotatably retained relative to the frame and a steering arrangement for enabling a steering of the front wheel;
a means for retaining the simulated two-wheeled vehicle relative to the platform with a roll axis;
means for enabling a rider to impart control inputs to the simulated two-wheeled vehicle and to the mobile platform comprising an accelerator control and a steering arrangement with an axis of rotation; and
a control system for imparting motion to the platform and the two-wheeled vehicle in response to control inputs from a rider wherein the control system comprises a propulsion arrangement for propelling the mobile platform in response to control input from the accelerator control, a steering arrangement for steering the mobile platform in response to control input from the steering arrangement, a rear wheel prooulsion arrangement for imparting angular velocity to the rear wheel of the simulated two-wheeled vehicle in response to control input from the accelerator control, and a tilting arrangement for tilting the two-wheeled vehicle through bank angles relative to the mobile platform.

2. The two-wheeled vehicular motion simulation arrangement of claim 1 wherein a mobile platform, wherein the mobile platform exhibits free and unbounded movement in all directions in relation to a support surface, comprises an upper platform and a lower platform, wherein the upper platform is pivotally retained relative to the lower platform, and wherein the two-wheeled vehicle is supported for pivoting with the upper platform.

3. The two-wheeled vehicular motion simulation arrangement of claim 2 further comprising inertial sensors operably associated with the two-wheeled vehicle for sensing accelerations of the two-wheeled vehicle.

4. The two-wheeled vehicular motion simulation arrangement of claim 2 further comprising load sensors operably associated with the two-wheeled vehicle for sensing load distributions of the two-wheeled vehicle.

5. The two-wheeled vehicular motion simulation arrangement of claim 2 further comprising foot members for engaging feet of a rider and wherein load sensors are operably associated with the foot members for sensing force applied by a rider.

6. The two-wheeled vehicular motion simulation arrangement of claim 1 further comprising a front wheel propulsion arrangement for imparting angular velocity to the front wheel of the simulated two-wheeled vehicle.

7. The two-wheeled vehicular motion simulation arrangement of claim 1 wherein the two-wheeled vehicle further comprises a steering fork and wherein the tilting arrangement comprises a forward support rod with a first end coupled to the steering fork and a second end pivotally retained relative to the mobile platform and a rearward support rod with a first end coupled to the frame and a second end pivotally retained relative to the mobile platform.

8. The two-wheeled vehicular motion simulation arrangement of claim 7 wherein the second end of the rearward support rod is pivotally retained relative to the platform by a ball joint.

9. The two-wheeled vehicular motion simulation arrangement of claim 8 wherein the rearward support rod and the ball joint relative to which it is retained are drivably associated with a quick response motion arrangement for imparting lateral movement to the support rod and the ball joint.

10. The two-wheeled vehicular motion simulation arrangement of claim 9 wherein the quick response motion arrangement comprises a torquing motor, a proximal control arm with a first end coupled to the torquing motor, and a distal control arm with a first end coupled to the proximal control arm and a second end drivingly associated with the ball joint.

11. The two-wheeled vehicular motion simulation arrangement of claim 7 wherein the forward support rod is extensible and retractable in relation to the mobile platform to enable the two-wheeled vehicle to be pitched.

12. The two-wheeled vehicular motion simulation arrangement of claim 1 wherein the front wheel and the axis of rotation of the steering arrangement establish a positive caster distance C and wherein the control system imparts motion to the platform and the two-wheeled vehicle according to a Theoretical Method of Operation wherein:

$$T_z=(F_z)(C)(\sin \theta_z)$$

Where,
- $F_z$ is a vertical force component exerted by a support surface in opposition to a downward force component exerted by the front wheel during a turn;
- $\theta_z$ is a bank angle to which the two-wheeled vehicle is tilted away from vertical; and
- $T_z$ is a torque produced by the vertical force component $F_z$.

13. The two-wheeled vehicular motion simulation arrangement of claim 12 wherein the Theoretical Method of Operation further operates under the equation:

$$T_x=(F_x)(C)(\cos \theta_z)$$

Where,
- $F_x$ is a lateral force component exerted by the support surface in opposition to a lateral force component exerted by the front wheel during a turn; and
- $T_x$ is a torque produced by the lateral force component $F_x$.

14. The two-wheeled vehicular motion simulation arrangement of claim 13 wherein the Theoretical Method of Operation further operates in response to a change in a center of gravity relative to the two-wheeled vehicle under the equation:

$$\text{Roll Acceleration}=(\Delta CG/R^2)(G/\cos \theta_z)$$

Where,
- $\Delta CG$ is a distance of change in the center of gravity;
- R is a radius of gyration of the two-wheeled vehicle; and
- G is gravity.

15. The two-wheeled vehicular motion simulation arrangement of claim 14 wherein the Theoretical Method of Operation further operates in response to a steering torque $T_s$ applied to the steering arrangement under the equation:

$$\text{Roll Acceleration}=(((T_sG)/(C\cos \theta_z))(\cos \theta_z))/M)/R$$

Where,
- $T_s$ is the steering torque; and
- M is a total mass of the two-wheeled vehicle and any rider thereon.

* * * * *